(12) United States Patent
Dolev et al.

(10) Patent No.: US 7,971,104 B2
(45) Date of Patent: Jun. 28, 2011

(54) APPARATUS AND METHODS FOR STABILIZATION OF PROCESSORS, OPERATING SYSTEMS AND OTHER HARDWARE AND/OR SOFTWARE CONFIGURATIONS

(76) Inventors: Shlomi Dolev, Omer (IL); Avraham Yinnon Haviv, Tel Aviv (IL)

( * ) Notice: Subject to any disclaimer, the term of this patent is extended or adjusted under 35 U.S.C. 154(b) by 721 days.

(21) Appl. No.: 11/902,572

(22) Filed: Sep. 24, 2007

(65) Prior Publication Data

US 2008/0098205 A1 Apr. 24, 2008

Related U.S. Application Data

(60) Provisional application No. 60/853,751, filed on Oct. 24, 2006.

(51) Int. Cl.
*G06F 11/00* (2006.01)
(52) U.S. Cl. .......................... 714/55; 712/226
(58) Field of Classification Search ............ 714/55
See application file for complete search history.

(56) References Cited

U.S. PATENT DOCUMENTS

| | | | | |
|---|---|---|---|---|
| 5,440,725 A * | 8/1995 | Weller et al. | ............. | 714/55 |
| 5,559,992 A * | 9/1996 | Stutz et al. | ............. | 711/163 |
| 5,598,577 A * | 1/1997 | Overfield | ............. | 710/10 |
| 5,758,112 A * | 5/1998 | Yeager et al. | ............. | 712/217 |
| 6,567,709 B1 * | 5/2003 | Malm et al. | ............. | 700/21 |
| 6,823,447 B2 * | 11/2004 | Hay et al. | ............. | 712/239 |
| 7,178,011 B2 * | 2/2007 | Seal et al. | ............. | 712/226 |
| 7,200,781 B2 * | 4/2007 | Mantey et al. | ............. | 714/53 |
| 7,434,002 B1 * | 10/2008 | Zedlewski et al. | ............. | 711/130 |
| 7,490,191 B2 * | 2/2009 | Illikkal et al. | ............. | 711/6 |
| 7,665,005 B2 * | 2/2010 | Szydlowski | ............. | 714/745 |
| 7,673,296 B2 * | 3/2010 | Collard et al. | ............. | 717/161 |
| 2004/0250178 A1 * | 12/2004 | Munguia et al. | ............. | 714/55 |
| 2005/0188274 A1 * | 8/2005 | Vedam et al. | ............. | 714/39 |
| 2007/0100987 A1 * | 5/2007 | Aggarwal et al. | ............. | 709/224 |
| 2007/0157197 A1 * | 7/2007 | Neiger et al. | ............. | 718/1 |
| 2007/0174685 A1 * | 7/2007 | Banks et al. | ............. | 714/12 |
| 2009/0006909 A1 * | 1/2009 | Ladd et al. | ............. | 714/57 |
| 2009/0024836 A1 * | 1/2009 | Shen et al. | ............. | 712/211 |

OTHER PUBLICATIONS

Brukman, et al., "Recovery oriented programming (Extended Abstract)", Department of Computer Science, Ben-Gurion University of the Negev, Beer-Sheva, 84105, Israel, pp. 1-16.

Dijkstra, "Short Communications Operating Systems: Self-stabilizing Systems in Spite of Distributed Control", Communications of the ACM, vol. 17, No. 11, pp. 643-644, Nov. 1974, Association for Computing Machinery, Inc.

(Continued)

*Primary Examiner* — Scott T Baderman
*Assistant Examiner* — Kamini Patel
(74) *Attorney, Agent, or Firm* — The Nath Law Group; Susanne M. Hopkins; William L. Klima

(57) ABSTRACT

Apparatus and methods for converting a processor, having a plurality of states and being operative to execute software operations stored in a memory device, into a self-stabilizing processor, comprising providing self-stabilizing watchdog hardware that, with given timing, interacts with the processor, in accordance with an interaction sequence that includes at least one trigger that sets the processor to a known state from among a set of at least one known states. Also described are applications for stabilization of operating systems and other hardware or software configurations, apparatus and methods for ensuring eventual invariance of software executed by a processor, and apparatus and methods for enforcing fixed software configurations.

21 Claims, 17 Drawing Sheets

OTHER PUBLICATIONS

Dolev, "Self-Stabilization", The MIT Press, 5 pages including book and author information, Massachusetts Instituted of Technology, Cambridge, Massachusetts, 2000. (last page blank).

Dolev, et al., "Self-Stabilizing Microprocessor: Analyzing and Overcoming Soft Errors", IEEE Transactions on Computers, vol. 55, No. 4, pp. 1-15, Apr. 2006, IEEE Computer Society.

Dolev, et al., "Self-Stabilizing Microprocessor: Analyzing and Overcoming Soft-Errors (Extended Abstract)", Department of Computer Science, Ben-Gurion University of the Negev, Israel, Müller-Schloer, et al. (Eds.): ARCS 2004, LNCS 2981, pp. 31-46, 2004, Springer-Verlag Berlin Heidelberg 2004.

Dolev, et al., "Self-stabilization Preserving Compiler (Extended Abstract)", Department of Computer Science, Ben-Gurion University of the Negev, Beer-Sheva, 84105, Israel, School of Computer Science, Tel-Aviv University, Tel-Aviv 69978, Israel, Herman, et al. (Eds.): SSS 2005, LNCS 3764, pp. 81-95, 2005, Springer-Verlag Berlin Heidelberg 2005.

Dolev, et al., "Self-Stabilization Preserving Compiler—Technical Report #2005-06", Jul. 2005, Self-Stabilization Preserving Compiler (Extended Abstract), Department of Computer Science, Ben-Gurion University of the Negev, Beer-Sheva, 84105, Israel, School of Computer Science, Tel-Aviv University, Tel-Aviv 69978, Israel, pp. 1-20.

Dolev, et al. "Self-Stabilization Virtual Machine Monitor (Enabling Technology)", Department of Computer Science, Ben-Gurion University of the Negev, Beer-Sheva, 84105, Israel, pp. 1-14, Aug. 19, 2006.

Dolev, et al., "Memory Management for Self-Stabilizing Operating Systems", Department of Computer Science, Ben-Gurion University of the Negev, Beer-Sheva, 84105, Israel, Rafael 3M, POB 2205, Haifa, Israel, pp. 1-20.

Hill, et al., "System Architecture Directions for Networked Sensors", Department of Electrical Engineering and Computer Sciences, University of California, Berkeley, Berkeley, CA, pp. 93-104, ASPLOS 2000, Cambridge, MA, Nov. 12-15, 2000, A.C.M. 2000.

Intel. "Intel 80200 Processor based on Intel XScale Microarchitecture: Developer's Manual", 288 Pages, Mar. 2003.

Intel. "Intel XScale Core: Developer's Manual", 220 Pages, Jan. 2004.

"ARM Architecture Reference Manual". ARM, 1138 Pages, ARM limited, Cambridge, England, 2005.

Maunder, et al., "The Test Access Port and Boundary-Scan Architecture: Chapter 4. IEEE Std 1149.1: The Top-Level View", pp. 33-49, IEEE Computer Society Press, Los Alamitos, California, 1990, Scan Test Devices with Octal Buffers, pp. 1-4, Texas Instruments, 1996, Texas Instruments Incorporated.

Tanenbaum, "Structured Computer Organization (4th Edition): International Edition". 12 pages including book information,Prentice-Hall, Inc., Upper Saddle River, NJ, USA, 1999.

* cited by examiner

US 7,971,104 B2

APPARATUS AND METHODS FOR STABILIZATION OF PROCESSORS, OPERATING SYSTEMS AND OTHER HARDWARE AND/OR SOFTWARE CONFIGURATIONS

REFERENCE TO CO-PENDING APPLICATIONS

Priority is claimed from U.S. provisional application No. 60/853,751, entitled "Apparatus and methods for stabilization of processors, operating systems and other hardware and/or software configurations" and filed Oct. 24, 2006.

FIELD OF THE INVENTION

The present invention relates generally to self-stabilization and specifically to self-stabilization in hardware and in software.

BACKGROUND OF THE INVENTION

The state of the art is believed to be represented by the following publications and documents, referred to by square-bracketed number herein:

[1] Olga Brukman and Shlomi Dolev. Recovery oriented programming. In *Self-Stabilizing Systems, Lecture Notes in Computer Science*. Springer Verlag, 2006.
[2] E. W. Dijkstra. Self-stabilizing systems in spite of distributed control. *Commun. ACM,* 11(17):643-644, 1974.
[3] Shlomi Dolev. *Self-Stabilization*. MIT Press, March 2000.
[4] Shlomi Dolev and Yinnon Haviv. "self-stabilizing microprocessor analyzing and overcoming soft-errors (extended abstract)". In *Organic and Pervasive Computing—ARCS 2004, International Conference on Architecture of Computing Systems*, volume 2981 of *Lecture Notes in Computer Science*, pages 31-46. Springer Verlag, 2004.
[5] Shlomi Dolev and Yinnon A. Haviv. Self-stabilizing microprocessor: Analyzing and overcoming soft errors. *IEEE Trans. Computers,* 55(4):385-399, 2006.
[6] Shlomi Dolev, Yinnon A. Haviv, and Mooly Sagiv. Self-stabilization preserving compiler. In *Self-Stabilizing Systems*, volume 3764 of *Lecture Notes in Computer Science*, pages 81-95. Springer Verlag, 2006.
[8] Shlomi Dolev and Reuven Yagel. Memory management for self-stabilizing operating systems. In *Self-Stabilizing Systems*, volume 3764 of *Lecture Notes in Computer Science*, pages 113-127. Springer Verlag, 2006.
[10] Jason Hill, Robert Szewczyk, Alec Woo, Seth Hollar, David Culler, and Kristofer Pister. System architecture directions for networked sensors. *SIGPLAN Not.,* 35(11): 93-104, 2000.
[11] Intel. *Intel 80200 Processor based on Intel XScale Microarchitecture,* 2000. http://www.intel.com/design/iio/manuals/273411.htm.
[12] Intel. *Intel XScale Core, Developer's Manual,* 2004. http://www.intel.com/design/intelxscale/273473.htm.
[13] David Seal. *ARM Architecture Reference Manual.* Addison-Wesley Longman Publishing Co., Inc., Boston, Mass., USA, 2000.
[14] IEEE Computer Society. *IEEE Standard Test Access Port and Boundary-Scan Architecture-IEEE Std* 1149.1, 2001. http://standards.ieee.org.
[15] Andrew S. Tanenbaum. *Structured computer organization* (3rd ed.). Prentice-Hall, Inc., Upper Saddle River, N.J., USA, 1989.

The disclosures of all publications mentioned in the specifications, and of the publications cited therein directly or indirectly, are hereby incorporated by reference.

SUMMARY OF THE INVENTION

The present invention seeks to provide methods and apparatus for generating self-stabilizing hardware and software.

There is thus provided, in accordance with a preferred embodiment of the present invention, a method for converting a processor, having a plurality of states and being operative to execute software operations stored in a memory device, into a self-stabilizing processor, the method comprising providing self-stabilizing watchdog hardware that, with given timing, interacts with the processor, in accordance with an interaction sequence that includes at least one trigger that sets the processor to a known state from among a set of at least one known states.

Further in accordance with a preferred embodiment of the present invention, the method also comprises resetting the processor at intervals, using the self-stabilizing watchdog hardware.

Still further in accordance with a preferred embodiment of the present invention, resetting occurs responsive to a software request.

Additionally in accordance with a preferred embodiment of the present invention, resetting is repeated if a predetermined time interval has elapsed without software requests.

Further in accordance with a preferred embodiment of the present invention, the interaction sequence comprises provision of notification to the processor that the trigger is about to become operative.

Further in accordance with a preferred embodiment of the present invention, the method also comprises providing a set of at least one software segments operative to store information which is to survive reset for continued use after reset, e.g. the save code of FIG. 17, or of FIG. 1, step 60; FIG. 2, step 160, or FIG. 3, step 230.

Still further in accordance with a preferred embodiment of the present invention, e.g. as in step 240 of the method of FIG. 3, the method also comprises providing software segments for execution by the processor after the trigger, the software segments being operative to check whether the current state of the system comprising the processor and the memory device is consistent and if not, to convert the current state into a consistent state.

Also provided, in accordance with another preferred embodiment of the present invention, is a method for ensuring eventual invariance of execution of software by a processor in that the software will only branch to an address which satisfies a sanity check, the method comprising adding a sanity check code segment prior to at least one control branch in the software; and at bounded intervals, during run-time, if the processor is found to be within a pre-branch segment comprising the sanity check segment and terminating at the next branch, ensuring that the processor has executed the sanity check in its entirety.

Further in accordance with a preferred embodiment of the present invention, the ensuring step comprises forcing the processor to repeat the sanity check if the processor is found to be within the pre-branch segment.

Still further in accordance with a preferred embodiment of the present invention, the method also comprises providing self-stabilizing watchdog hardware that, with given timing, interacts with the processor, in accordance with an interaction sequence that includes at least one trigger that sets the processor to a known state from among a set of at least one known states, and providing software segments for execution by the processor after the trigger, the software segments being operative to check whether the current state of the system comprising the processor and the memory device is within a pre-branch segment having a starting point and if so, returning the system to the starting point.

Also provided, in accordance with still another preferred embodiment of the present invention, is a method for enforcing a fixed software configuration notwithstanding occurrence of transient errors, the method comprising in the course of generating software which assigns values to a plurality of variables, defining at least one variable as a configurational variable, hard-wiring the values of the at least one configurational variable, and redirecting at least one subsequent access attempt of at least one individual configurational variable, to the hard-wired value of the individual configurational variable.

Further in accordance with a preferred embodiment of the present invention, the hard-wiring step is performed (e.g. as in FIG. 5, step 440) when the values of all configuration variables defined in the defining step, are final according to a finality determination criterion e.g. the change in switch state described in step 470 of FIG. 5.

Still further in accordance with a preferred embodiment of the present invention, the finality determination criterion comprises an input by a human operator e.g. as in step 470 of FIG. 5.

Additionally in accordance with a preferred embodiment of the present invention, the processor comprises a microprocessor.

Also provided, in accordance with yet another preferred embodiment of the present invention, is apparatus for converting a processor, having a plurality of states and being operative to execute software operations stored in a memory device, into a self-stabilizing processor, the apparatus comprising self-stabilizing watchdog hardware that, with given timing, interacts with the processor, in accordance with an interaction sequence that includes at least one trigger that sets the processor to a known state from among a set of at least one known states.

Yet further provided, in accordance with another preferred embodiment of the present invention, is a system for ensuring eventual invariance of execution of software by a processor in that the software will only branch to an address which satisfies a sanity check, the system comprising a sanity check completion check functionality operative at bounded intervals, during run-time, each time that the processor is found to be within a pre-branch segment comprising a sanity check segment and terminating at the next of at least one control branches in the software, to ensure that the processor has executed the sanity check in its entirety.

Further in accordance with a preferred embodiment of the present invention, the method is additionally operative to execute a sanity check before executing at least one non-branch command which is not a branch command, including adding sanity check segments prior to at least one non-branch command, thereby to ensure that once the adding and ensuring steps have been performed, any sanity check segment which is executed prior to a sanity checked command and which is designed to start in any possible software state, is executed entirely.

Further provided, in accordance with still another preferred embodiment of the present invention, is a system for enforcing a fixed software configuration comprising a hard-wired storage medium storing at least one values of at least one variable defined as configurational; and an access attempt redirector operative to redirect at least one subsequent access attempt of at least one individual configurational variable, to the value of the individual configurational variable as stored in the hard-wired storage medium.

Still further in accordance with a preferred embodiment of the present invention, the method also comprises providing a processor utilizing system which utilizes the processor; providing at least one design software segment operative to perform a check determining whether a current state of the processor utilizing system is consistent; and ensuring periodic execution of the check by at least one design software segment.

Further in accordance with a preferred embodiment of the present invention, the processor utilizing system comprises an operating system.

Still further in accordance with a preferred embodiment of the present invention, the processor utilizing system comprises a virtual machine monitor executing a plurality of virtual systems which all share the processor.

Further in accordance with a preferred embodiment of the present invention, at least one of the virtual systems executed by the virtualization system comprises a monitoring virtual system which monitors the remaining ones of the virtual systems executed by the virtualization system.

Still further in accordance with a preferred embodiment of the present invention, the monitoring virtual system has access to all variables accessed by the virtualization system.

Further in accordance with a preferred embodiment of the present invention, the processor is operative to serve an element of a communication network having a communication protocol and a bandwidth and the plurality of virtual systems executed by the virtual machine monitor comprises an operating system of the communication network element; and a communication protocol manager which manages the communication protocol, thereby to generate a plurality of separate and separately stabilizing virtual communication layers each having a communication capacity, and each is secured from the influence of the activity of the other.

Still further in accordance with a preferred embodiment of the present invention, the element of a communication network comprises a router.

Further in accordance with a preferred embodiment of the present invention, the method also comprises configuring the monitoring virtual system to allot at least a constant minimal share of the bandwidth to the communication protocol manager.

BRIEF DESCRIPTION OF THE DRAWINGS

Preferred embodiments of the present invention are illustrated in the following drawings.

DETAILED DESCRIPTION OF PREFERRED EMBODIMENTS

1. Introduction

Figure 1:
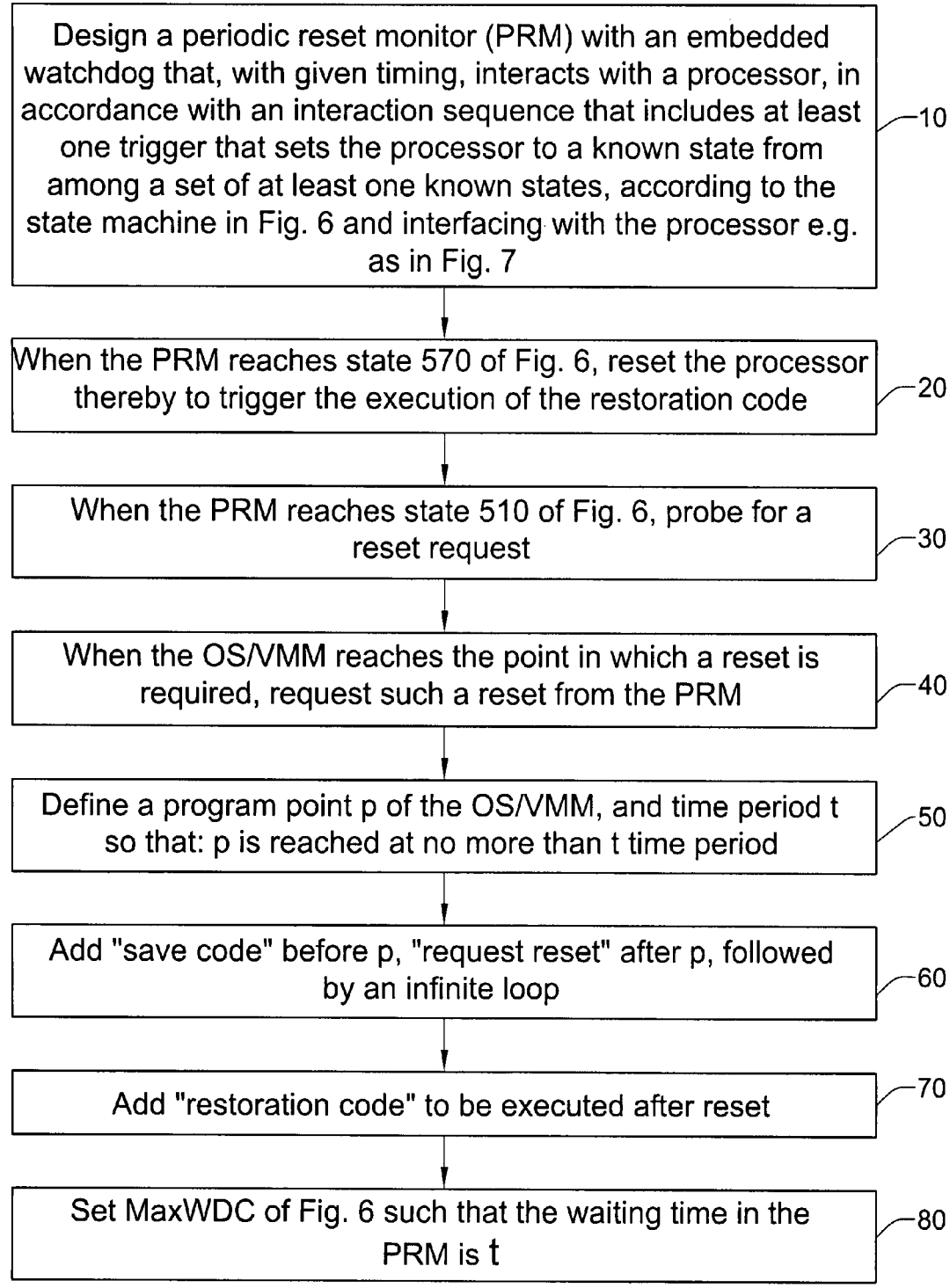
FIG. 1 is a simplified flowchart illustration of a preferred method for converting a processor into a self-stabilizing microprocessor, in accordance with a first embodiment of the present invention and employing periodic reset monitor (PRM) apparatus constructed and operative in accordance with a preferred embodiment of the present invention.

Hardware and software components described herein are operative for enabling the creation of a self-stabilizing OS/VMM on top of an off-the-shelf, non-self-stabilizing processor. "Watchdog" hardware termed herein "periodic reset monitor" (PRM) is provided in accordance with one embodiment of the invention. According to another embodiment, stabilization enabling hardware (SEH) is provided which removes any real time requirement from the OS/VMM. A stabilization enabling system that extends the SEH with some software components provides the user (such as an OS/VMM designer) with a self-stabilizing processor abstraction. Adapting the current OS/VMM code to be self-stabilizing is supported by using a mechanism for enforcing the software configuration.

The invention as described herein encompasses a plethora of systems and methods for stabilization including but not limited to those specifically illustrated in FIGS. 1-26.

Self-Stabilization.

Self-stabilization is an important fault-tolerance paradigm [2,3]. A system that is designed to be self-stabilizing automatically recovers from an arbitrary state. No assumption need be made on how the unexpected state is reached, only that the error that caused the unexpected state is transient.

One event that can be modeled as a transient fault is a transient violation of input sequence assumptions. Currently, a significant number of system failures originates from a sequence of inputs which has not been predicted during the implementation of the system. Although in most cases the unpredicted sequence is defined as illegal in the specifications, the implementation has failed to properly verify the consistency of the input sequence. The latter causes the system to fail and reach an illegal state from which the system will not recover. Even if these erroneous sequences are not frequent, and even if they are handled manually (i.e., by a human operator), the system may suffer from a considerable downtime since identifying the problem may take some time. Assuming these errors are rare and not malicious, one can model them as transient faults.

Another example of transient errors is soft-errors ([5]). Soft-errors are changes in memory values caused by cosmic rays. Decrease in size of computing features as well as in power usage and shortening of the micro-cycle period, enlarges the influence of soft-errors.

Enforcing Stabilization on a Blackbox Processor.

Processor specifications expose the programmer to an abstract presentation of the processor behavior and hide implementation details. Among other benefits, the abstract description facilitates programming and allows the processor designer to change the implementation. However, in the context of soft-errors and self-stabilization, the abstract presentation implies the following hazard. The processor state space (in terms of implementation) contains many states which are not supposed to be reached. The behavior of the processor from these erroneous states does not correspond to the behavior specified when starting in any of the abstract states. When such an erroneous state is reached, the self-stabilizing program may face a permanent illegal behavior of the processor. Under this persistent illegal behavior of the processor, no software can exhibit the desired behavior.

An implementation of a self-stabilizing processor is shown in [5]. Started in any state, the processor converges into a subset of its states in which it performs fetching, decoding and execution of machine instructions according to the manufacturer's specifications. A simple processor was considered in [5] (the processor described in [15]), which allows the self-stabilization property to be proven by considering (the micro-code of) the entire implementation.

In contrast, the implementations of current processors are very complex and may contain high coupling between components. Using the above approach may practically require redesigning the processor from scratch. A first embodiment, described herein, forces the stabilization property on off-the-shelf commercial processors. This embodiment uses only modest additional hardware that is external to the processor. The hardware enforces the consistency and the setup parameters of the processor.

At least three methods are proposed herein for enforcing stabilization on a blackbox processor. The first method (Section 2) is based on periodically resetting the processor by the OS/VMM. Additional hardware is added to the processor which monitors and assists in the reset procedure. The OS/VMM may choose the time to perform such a reset, but if the OS/VMM fails to request a reset within a predetermined stretch of time, the additional hardware enforces this reset. The second method (Section 3) extends the first method by notifying the OS/VMM concerning the upcoming (maybe enforced) reset. This addition enables the third method (the SES, described in Section 4) to eliminate any requirement to request a reset within the predetermined period of time at the cost of slightly restricting the processor specifications. The SES facilitates the design of the OS/VMM by providing a framework for enforcing invariants on the state of the self-stabilizing OS/VMM.

Reference [5] describes use of a watchdog for detecting that the processor repeatedly performs the cycle comprising fetching, decoding and execution. The method suggested in [5] used a signal sent by the processor to decide when to reset the watchdog. The signal indicated that the processor is starting a new cycle (of fetching, decoding and execution). The signal sent by the processor actually indicated that a predicate p, over the internal state of the processor holds. The predicate p ensured that the processor is in a legal state and therefore behaves according to the specifications. Moreover, the predicate p is correct infinitely often. The existence of such a predicate is reasonable for basic processors, such as the one in [5]. The predicate p in [5] verifies that the value of the microprogram-counter corresponds to the first micro-code instruction. However, the internal state of commercial processors is complex, making the problem of finding such a predicate hard and even practically infeasible. In the current specification, in contrast, the watchdog is typically used for ensuring that the OS resets the processor infinitely often, enforcing its internal state to be a legal one.

Self-Stabilizing OSs and VMMs.

Operating systems (OSs) are used for sharing resources and providing hardware abstraction in virtually all computer systems. Virtual Machine Monitors (VMMS), such as XEN, VMware and Microsoft Virtual Server, are becoming popular and may soon be used to consolidate servers in many server farms. Therefore, it is crucial that both OSs and VMMs never fail. Designing a system that never fails unconditionally is impossible in the presence of transient errors, because a transient error may change the output of the system thus causing a fault. Fortunately one can ensure that the system will automatically repair itself following such transient error. Started in an arbitrary state, a self-stabilizing OS or VMM exhibits a legal behavior following a finite and preferably short stabilization period.

The stabilization property of OSs is helpful for supporting self-stabilizing software ([3]) and self-stabilizing monitoring environment, such as the one described in [1]. A self-stabilizing OS is designed in [8]. The operating system is designed from scratch and written in machine code. The OS described in [8] is comparable to the TinyOS [10] and both are simpler than conventional OSs. Redesigning a fully functional industrial quality kernel from scratch and proving its stabilization may demand enormous resources.

A method which enables existing OS/VMMS code to be adapted to be self-stabilizing is described herein in Section 5. The framework reduces the quantity of code changes which may be required by allowing the designer to focus only on the parts of the state which are dynamic; i.e., parts that may be changed after the system setup and configuration. The framework described in section 5 also enables the OS/VMM designer to safely separate the components of the OS/VMM.

Section 6 describes methods for creating a self-stabilizing OS/VMM and describes possible applications of such systems.

2 Periodic Reset Monitor

A first method shown and described herein suggests enforcing the stabilization on the processor by issuing a periodic reset. The OS/VMM typically requests a reset every predetermined period of time. The operating system typically cannot guarantee anything when the processor behavior is illegal and when the OS/VMM converges from a transient fault. Therefore, according to certain embodiments of the invention, additional hardware, the Periodic Reset Monitor (PRM), is used, which ensures that resets are performed periodically.

Figure 6:
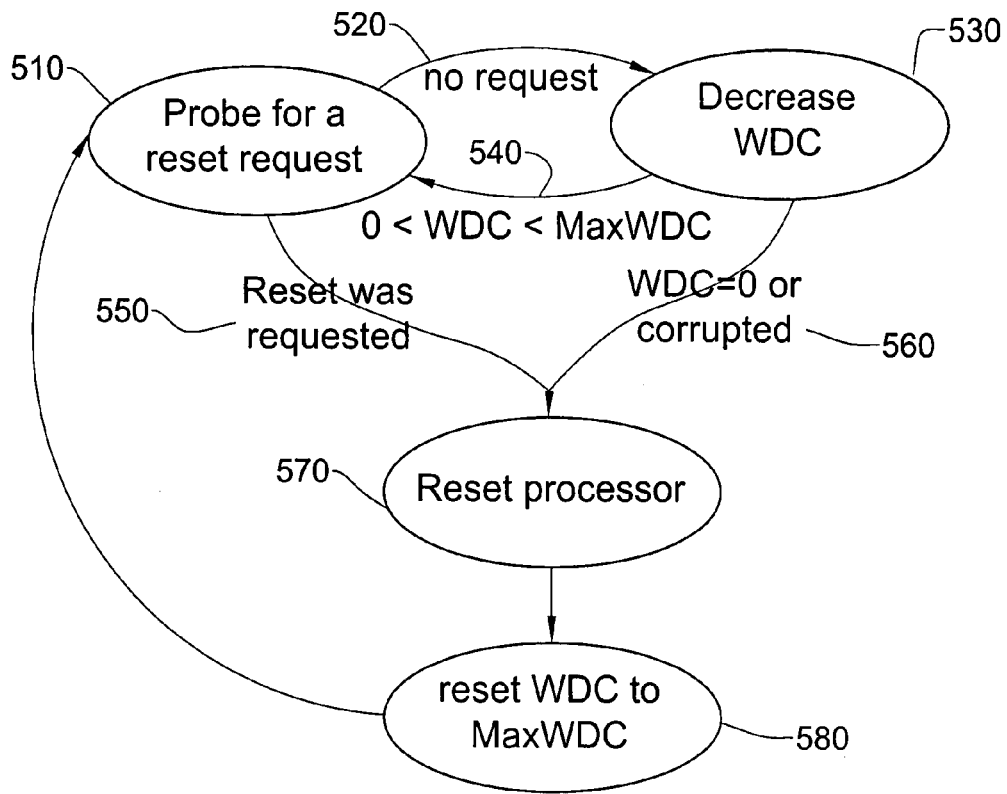
FIG. 6 is a simplified state machine diagram describing periodic reset monitor (PRM) apparatus constructed and operative in accordance with a preferred embodiment of the present invention and useful inter alia in the method of FIG. 1.

FIG. 6 illustrates the state machine of the PRM. Initially the PRM is set to probe for a reset request (state 510). The watchdog counter (WDC) is a variable used by the state machine and is initially set to MaxWDC. If a request was made (550), the system continues into a state in which a reset of the processor takes place (state 570). If no request is made (520), the PRM decreases the value of the watchdog counter (WDC)

by one (state 530). Then, the value of WDC is examined. If the value 0 is not reached and the value of the WDC is less than MaxWDC (i.e., the value is correct, 540) then the PRM continues probing for a reset request (state 510). Otherwise the WDC values is incorrect or the time to enforce a reset is reached (560), and the system continues into a state in which a reset of the processor takes place (state 570). After resetting the processor, the PRM continues to state 580, resets the WDC to its initial value MaxWDC (state 580), and returns to the initial state (state 510).

The value of MaxWDC typically influences the period of time the PRM waits for the OS/VMM to request a reset. If the OS/VMM does not request a reset within this time, the PRM enforces one. Setting the value of MaxWDC too low may have a negative influence on the performance or even lead to a situation in which the OS/VMM does not request a reset on time during fault free periods. On the other hand, the stabilization time of the processor is proportional to the value of MaxWDC; a high value of MaxWDC implies a long stabilization period.

When implementing the PRM, as for example in step 10 of FIG. 1, it is desired to ensure that any refinement made in the implementation eventually behaves according to the state machine shown in FIG. 6. Use of the same relation for programs compiled by a stabilization preserving compiler is described in [6]. The top level state machine can be implemented, for example, using EPROM, by placing commands that branch to the initial state in all locations that are not used in the implementation. The refinements of steps 30 and 80 can be easily performed by functional blocks (that have no state), ensuring that the state machine in FIG. 6 never ceases to advance from these states.

The implementation of the probe (state 510) and reset (state 570) is specific to each embodiment. The implementation is made by a sub state machine with an initial state and a non empty set of final states. When the top level state (510 or 570) is reached, the sub state machine is set to its initial state. Then, the top level state machine stops and only the sub state machine advances. When the sub state machine reaches one of its final states, the top level state machine advances according to the final state reached. The interaction between the top level state machine and the sub state machine can be regarded as a function call. The result of the function call is expressed in the final state of the sub state machine that was reached.

To ensure that the top level state machine in FIG. 6 never ceases to advance, the sub state machines implementing each of the two external functions (probe and reset, performed in states 510 and 570 respectively) typically reaches one of its final states when started in any of its internal states. The following is a preferred property of the probe function and the reset procedure.

Property 2.1 Started in any of their internal state, the probe function and the reset procedure eventually terminate.

Assuming that the implementation satisfies Property 2.1, the PRM executes periodic resets, which may be expressed as the following Property 2.1:

Started in any state, eventually a reset of the processor takes place.

This is the case, typically, because the only loop in the state machine shown in FIG. 6 which does not reach state 570 is the loop traversing states 510 and 530. After the first iteration in this loop, the watchdog counter (WDC) may be in the range {0, MaxWDC-1}. Since each iteration decreases WDC by one and no other changes to WDC are made during the iteration, the value of WDC eventually reaches 0 and a reset is initiated.

2.1 Using the PRM

Figure 7:
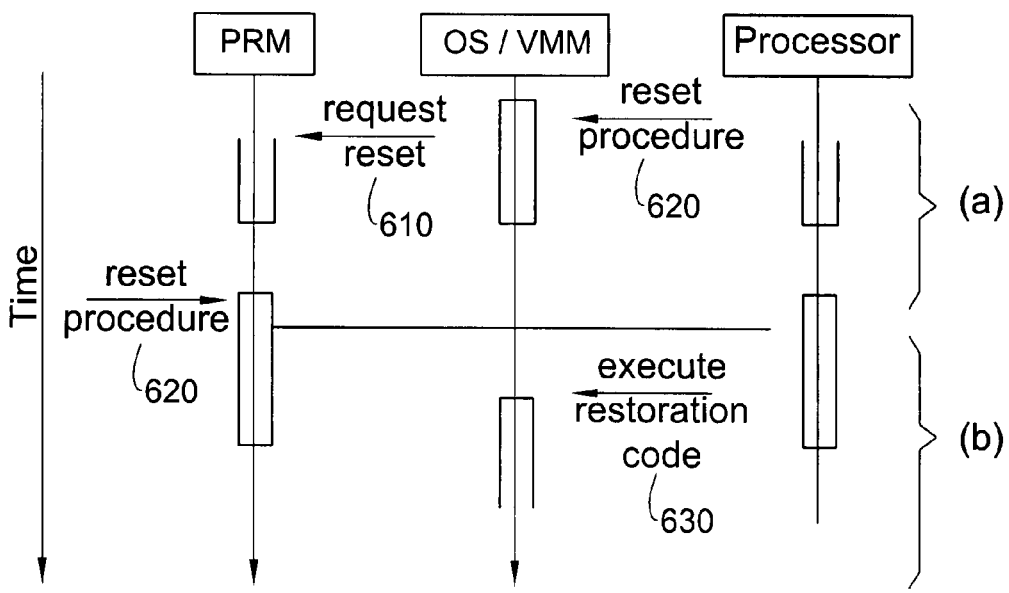
FIG. 7 is an interaction diagram describing interactions between the PRM apparatus of FIG. 6 and its associated operating system, according to certain embodiments of the present invention.

The designer of an OS/VMM when using the PRM is typically required to request a reset before such a reset is enforced by the PRM. Resetting the processor implies that the registers are set to their initial values as specified in the processor specifications. However, the main memory of the processor is left unchanged. Therefore, the OS/VMM designer typically saves all the registers which contain information which is to be used following the reset. The designer can avoid saving registers that have a constant value throughout the OS/VMM runtime. These registers can be restored into their predetermined initial values. The interface between the PRM and its user includes two points: The first is the request-reset procedure, a procedure of requesting a reset from the PRM (which is executed by the OS/VMM). The second point is the restoration-code, executed by the processor following a reset. FIG. 7 illustrates a preferred interaction between the OS/VMM, the processor and the PRM. The upper level (a) of FIG. 7 illustrates the scenario in which the OS requests a reset from the PRM. The lower level (b) of FIG. 7, illustrates the message exchanged between the OS/VMM and the SEH when the SEH executes its reset procedure (state 570 in FIG. 6).

Figure 8:
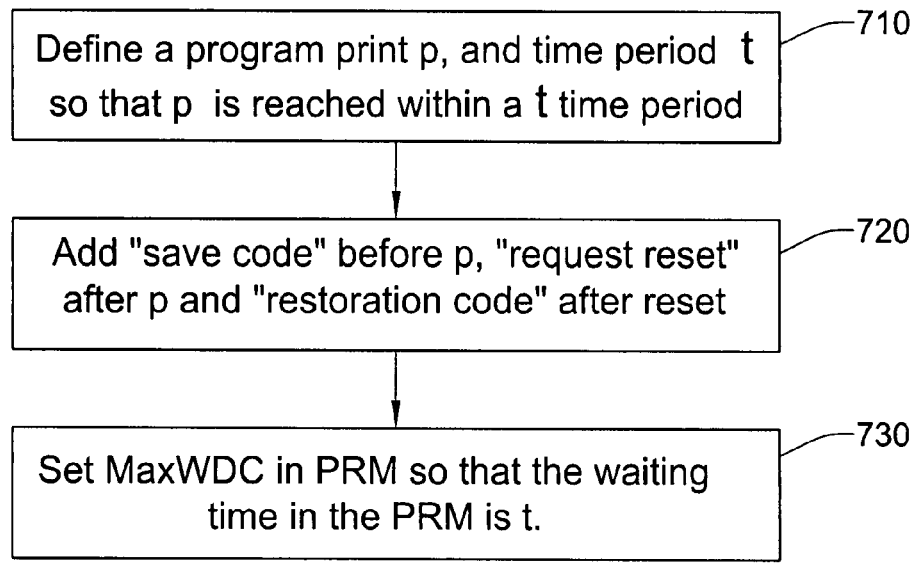
FIG. 8 is a simplified flowchart illustration of a preferred method for using the PRM apparatus of FIG. 6, in accordance with certain embodiments of the present invention.

FIG. 8 illustrates a preferred method by which the OS/VMM designer may use the PRM.

The designer of the OS/VMM preferably performs the following steps to facilitate use of the PRM. First, a program point p, which is reached infinitely often, is picked by the designer. The designer may desire to be able to show that this program point is reached at least every t' time units (for some constant t'). For example, the context switch point between tasks has this property in systems with preemptive scheduling. Then, the designer may write a code that saves the parts of the state which will be needed after the reset. A reset request from the PRM is added at the end of this code (the request-reset procedure, 620), followed by an infinite loop. Next, the designer may add the code for restoring the state (the restoration-code, 630). The restoration-code can use the parts of the state which have been saved prior to the reset by the save-code. Next, the designer may establish an upper bound, t, for the time it takes for the system to reach the request-reset. Then, the designer may set MaxWDC, used in FIG. 6, to a value which corresponds to t. The system need not request a reset every t time period, considering only executions that start in a state in which the processor behaves according to the specifications and the internal state of the OS/VMM is legal.

Following a reset, the processor operates according to its original specifications, with the augmented ability to request a reset from the PRM and with the added functionality of requesting a reset before the watchdog timer expires. This behavior of the processor (augmented by the PRM) is denoted herein as $LE_{prm}$. It is appreciated that the ability to request a reset may override some of the processor's functionality. When implementing the PRM, typically, the redundant functionality of the processor, which is not used by the OS/VMM should be overridden. The ability to request a reset typically overrides some functionality of the processor. When implementing the PRM, preferably, redundant functionality of the processor, which is not used by the OS/VMM, should be selected to be overridden.

2.2 Reduced Predicates and the PRM

When using the PRM, the designer may choose the preferred time to perform a reset. In particular, the designer may choose to reset the processor at certain point of time in which it is easier to check the consistency of the state. For example, choosing to perform the reset request just before the context switch, removes any need to check the consistency of the OS/VMM stack (since the stack is emptied upon a context switch).

The designer typically chooses a predicate p over the state. The predicate p should identify a subset of the states $S_p$, starting from which the behavior of the OS/VMM is legal. Moreover, the predicate p may frequently hold in any execution and the designer may identify the states in which the predicate holds and may add code that requests a reset at these states.

According to an embodiment of the above technique, similarly to the *PRM*, the *OS/VMM* requests at least one reset during every predetermined period of time. An alternative technique is described in Section 3 below.

2.3 Implementation Details for the PRM (Using Intel XScale)

In steps 20-40 of FIG. 1, the PRM is caused to interact with the OS/VMM and the processor, using the interaction diagram of FIG. 7.

One possible embodiment for the PRM e.g. as generated in accordance with the method of FIG. 1, is in the scope of the XScale environment. Exemplary implementation principles for the Xscale environment are now described. The XScale core is used in various Intel processors, ranging from network and I/O processors to handhelds and cellular phones. The XScale core is ARMv5TE compliant. Specific processors built upon XScale add functionality using the standard mechanisms of ARM for accessing additional coprocessors and system configurations. The implementation details are based on the ARM v5 specifications [13], Intel XScale core specifications [12] and the specifications of Intel's 80200 processor (which is used for network and I/O processors [11]). The three parts of the specifications ([13,12,11]) define the behavior of the processor in some scenarios as "undefined" or "unpredictable", for example, section 3.3 in [12] or section 2.5 in [13]. It is assumed that following such scenarios, the processor remains in a legal state. Thus, the processor continues fetching decoding and executing instructions according to the specifications.

The XScale core allows the programmer to perform "on chip emulation", comprising debugging of programs by executing them on the processor itself (as opposed to debugging the program by executing it on a simulator), and using the debugging mechanism, integrated in the processor, for accessing and controlling the program that is being debugged. The programmer uses a debugger, which is run on a remote host and interfaces with the XScale processor through the "Test Access Port" (TAP) using a protocol defined by the "Joint Test Action Group" (JTAG, IEEE Std 1149.1, see [14]). The JTAG protocol allows scanning data into (writing) and from (reading) special "JTAG registers" in the processor.

Referring now to step 30 of FIG. 1, the specific XScale application shown and described herein by way of example may use TX, a JTAG register designed for sending data from the processor to the debugger. The TX register is scanned out by the PRM whenever the PRM wishes to probe for a reset request. The OS/VMM, on the other hand, writes to the TX register for requesting a reset. The scanning of the TX register is a procedure that is composed of a constant number of steps and therefore can be implemented in the PRM as a straight line state machine. Moreover, the reset of the processor (and the TAP), known as "cold-reset" in XScale terms, is also performed using a constant number of steps. This ensures that the above-referenced Property holds for this implementation.

Figure 9:
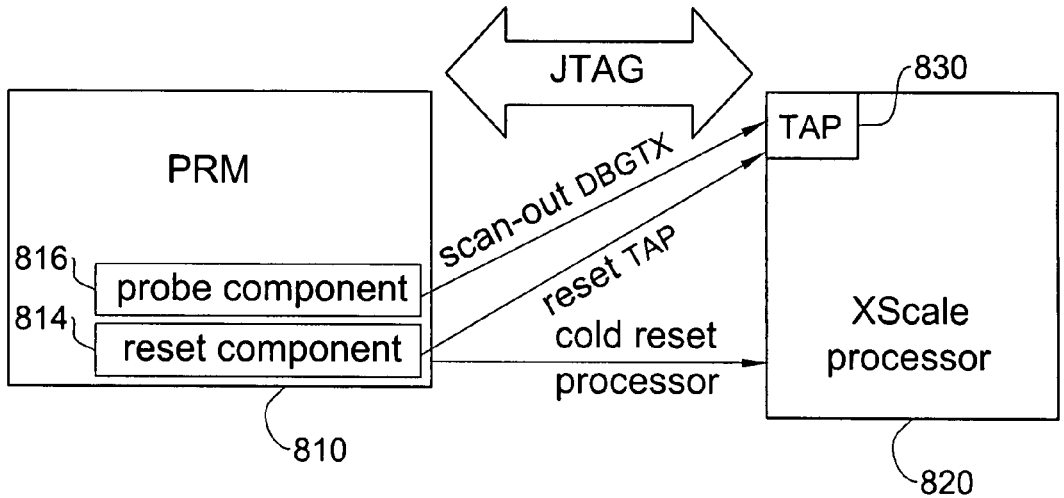
FIG. 9 is a simplified diagram of interactions between the PRM apparatus of FIG. 6 and an associated Xscale processor provided in accordance with certain embodiments of the invention.

FIG. 9 illustrates a block diagram of the PRM embodiment. The PRM (10) communicates with the XScale processor (20) through the Test Access Port (TAP—30) using a protocol defined by the "Joint Test Action Group" (JTAG, IEEE Std 1149.1, see [14]).

Components of a Preferred Embodiment

One preferred embodiment includes two hardware components. The first hardware component may be embedded in the PRM and enable it to probe for a reset request sent by the OS/VMM. The second component may be used for resetting the processor (and the TAP).

The PRM component that probes for a reset request (the first hardware component) typically uses JTAG to scan out (read) the DBGTX register. Typically, the first bit of the scanned data will be 1 if the OS/VMM requested a warm-boot (Section 9.11.2.1 in [12]).

The second component may be used for resetting the processor. The processor reset (known as "cold-reset" in XScale), may be carried out according to the protocol described in Section 8.2 in [11]. During a reset, the TAP may also be reset, causing the processor and the PRM components which handle the JTAG protocol to regain synchronization and exhibit legal behavior.

Property 2.1 holds for this implementation since both components may be implemented as a straight line state machine (with no loops).

3 The Stabilization Enabling Hardware (SEH)—Supporting Enforced Resets

Figure 2:
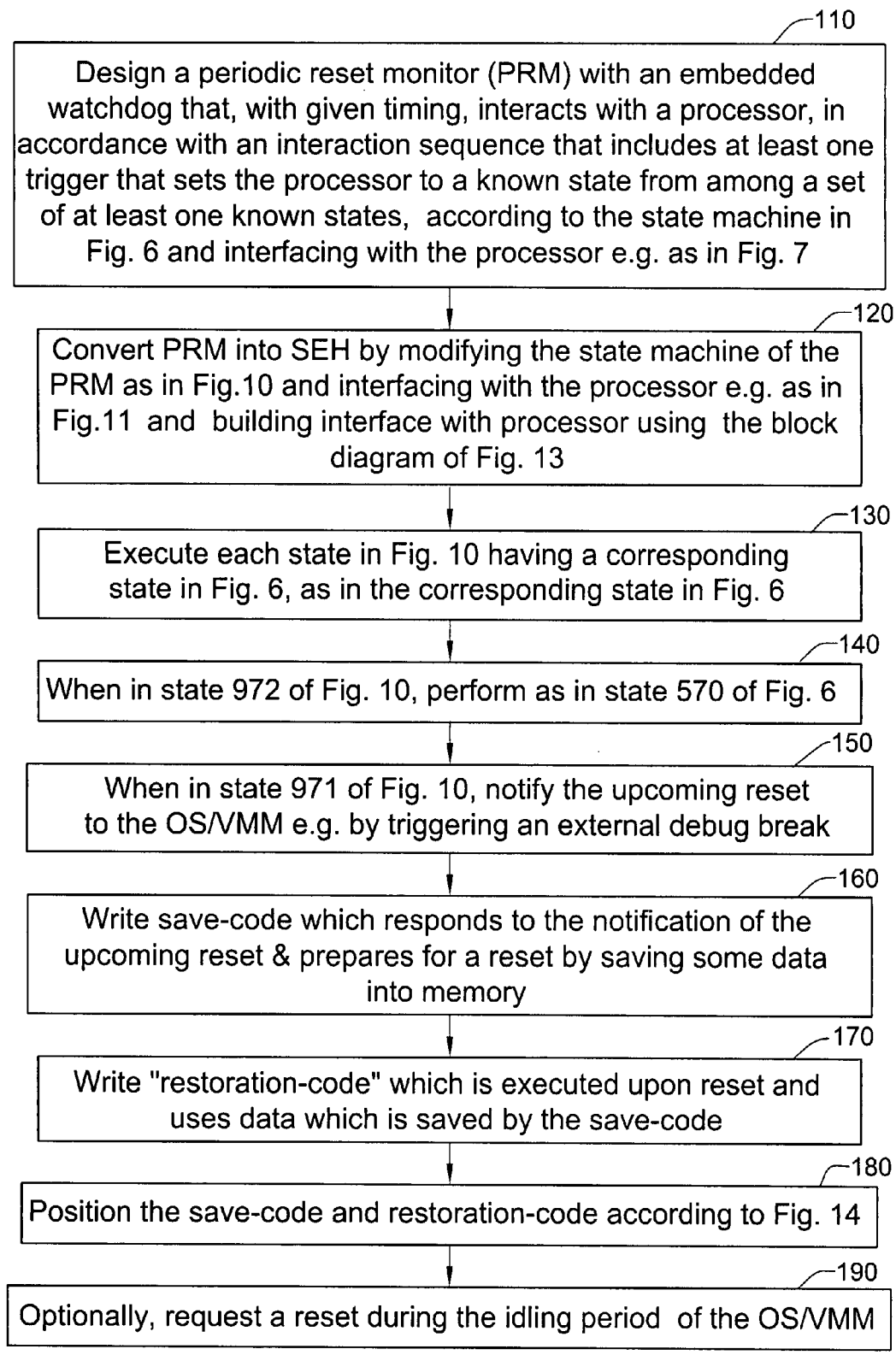
FIG. 2 is a simplified flowchart illustration of a preferred method for converting a processor into a self-stabilizing microprocessor, in accordance with a second embodiment of the present invention and employing stabilization enabling hardware (SEH) apparatus constructed and operative in accordance with a preferred embodiment of the present invention; it is noted that in steps 130-150, the SEH is caused to interact with the operating system of a virtual machine monitor according to FIG. 11.
Figure 10:
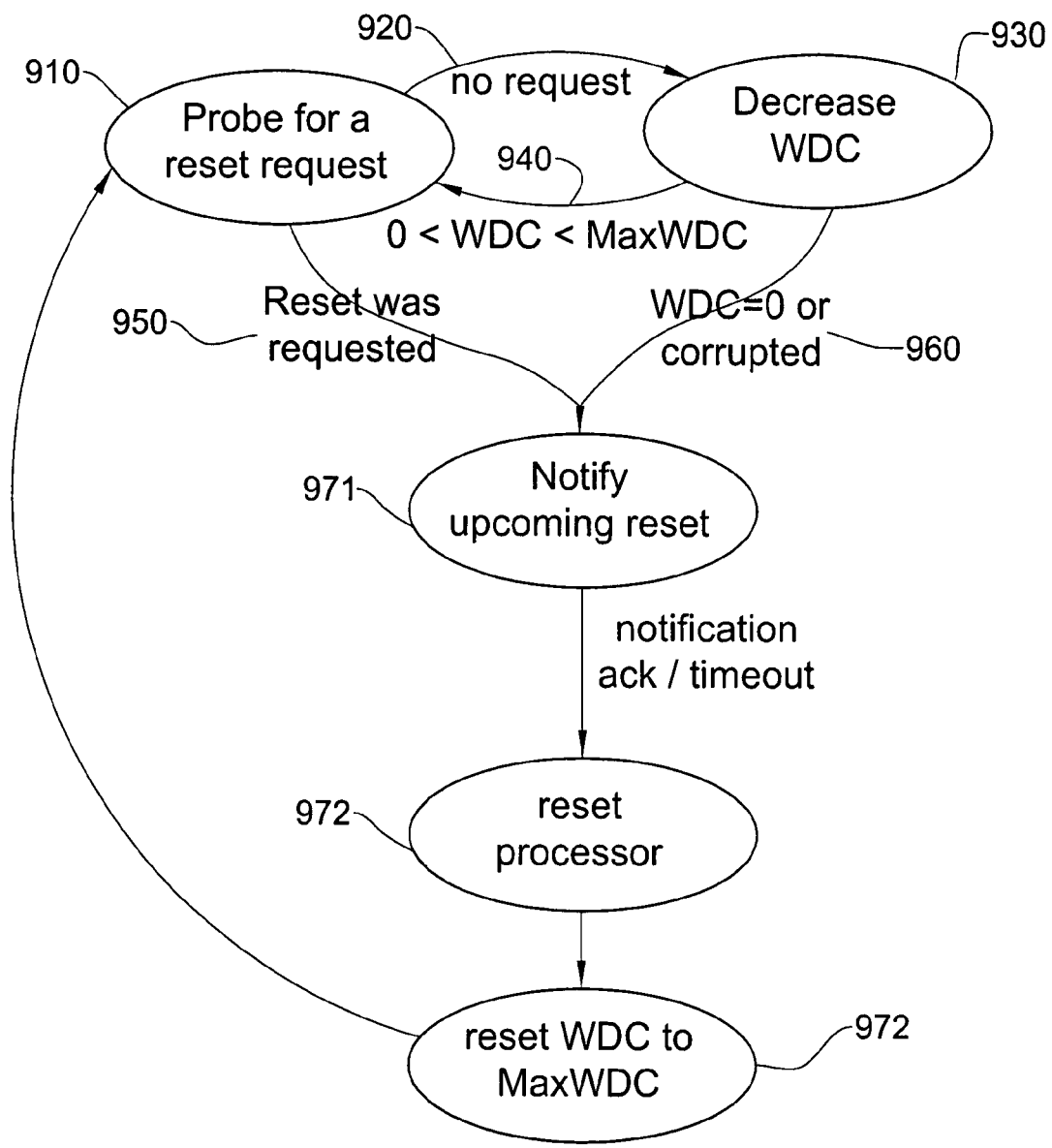
FIG. 10 is a simplified state machine diagram describing stabilization enabling hardware (SEH) apparatus constructed and operative in accordance with a preferred embodiment of the present invention and useful inter alia in the method of FIG. 2.

Referring now to FIG. 2, step 120, the designer of the OS/VMM may prefer not to have to request a reset periodically. In order to support such an OS/VMM, according to certain embodiments of the present invention, a warning message is provided by the PRM to the OS/VMM before executing the reset. In terms of the state machine of the PRM (FIG. 6), state 570 is split into two states (971 and 972), as illustrated in FIG. 10 and as performed e.g. in step 120 of FIG. 2. The first state (971) executes an asynchronous call to the OS/VMM, notifying the upcoming reset. Then, the PRM waits for the OS/VMM to save the state in the memory and to acknowledge that it is ready for a reset. Upon receiving an acknowledgement or if such an acknowledgement does not arrive within a predetermined period of time, the PRM advances to state 972, in which the processor is reset. Bounding the period of time that the PRM waits in state 971 for a notification from the OS/VMM ensures that the state machine shown in FIG. 6 never ceases to advance. This behavior of the processor (augmented by the SEH) is denoted herein as $LE_{seh}$.

3.1 Using the SEH

The designer of the OS/VMM that uses the SEH typically interacts with the SEH at four different points. The first two points are typically identical to those used for interacting with the PRM; i.e. the request-reset procedure and the restoration-code. The third interface point is a code that is called by the SEH before executing a reset (at state 971 in FIG. 10). This code is termed herein "save-code". Since the execution of the save-code is initiated by the SEH (as opposed to the OS/VMM), the third interface point is implemented as an interrupt handler. The fourth interface point is a procedure called by the save-code, which acknowledges the SEH notification and signals the SEH that the OS/VMM is ready for a reset. The execution of this procedure, while the SEH is in state 971, causes the SEH state machine to advance to state 972.

Figure 11:
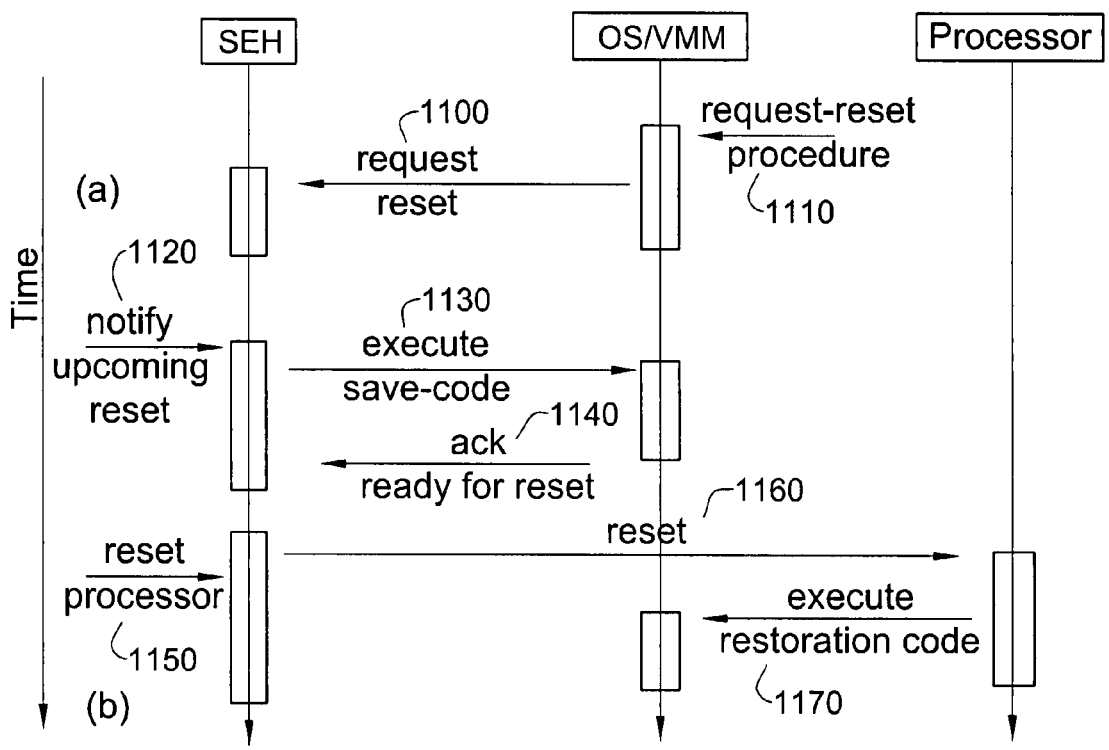
FIG. 11 is an interaction diagram describing interactions between the SEH apparatus of FIG. 10 and its associated operating system, according to certain embodiments of the present invention.

FIG. 11 illustrates the interaction between the OS/VMM and the SEH. The upper level of FIG. 11, (a), illustrates the scenario in which the OS/VMM requests a reset from the SEH. The lower level in FIG. 11, (b), illustrates the message exchanged between the OS/VMM and the SEH when the SEH executes its reset procedure (states 971 and 072 in FIG. 10).

Figure 12:
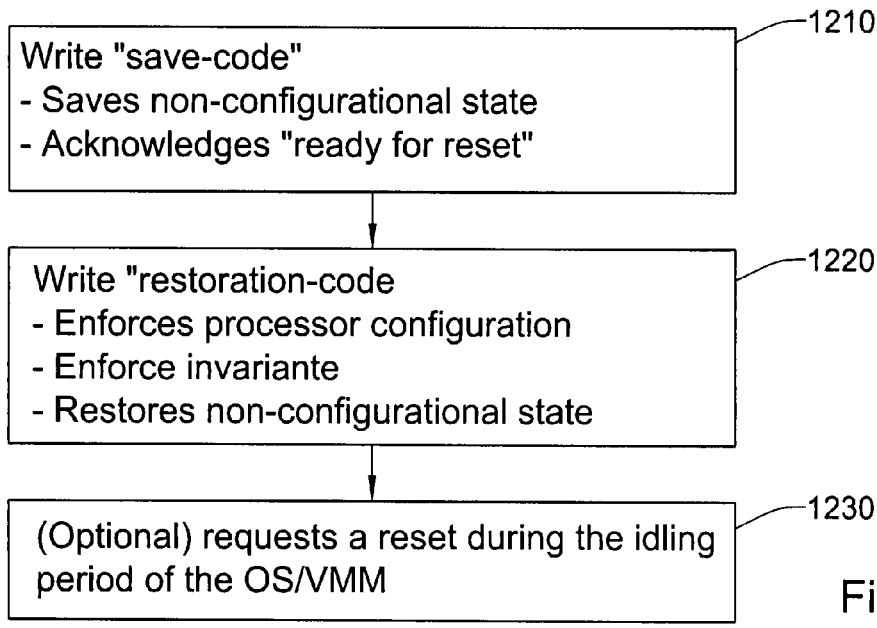
FIG. 12 is a simplified flowchart illustration of a preferred method for using the SEH apparatus e.g. of FIG. 9, in accordance with certain embodiments of the present invention.

FIG. 12 illustrates a preferred method by which the OS/VMM designer may use the SEH. The designer typically writes the save-code (1210) and restoration-code (1220). The semantics obtained by the processor during fault free periods is closely related to the content of the save and restoration code. The designer is typically aware that anytime during the execution of the OS/VMM, the following sequence may occur: execution of the save-code, reset of the processor and execution of the restore-code. The designer may choose to save and restore any parts of the processor state. Moreover, the designer is free to enforce invariants of the restored state.

The designer may optionally choose to initiate a reset at a timing which best suits the OS/VMM (1230). For example, the designer may choose to request a reset during the idling period of the OS/VMM. Requesting a reset is performed, as in the PRM, by using the request-reset procedure. After requesting a reset, the OS/VMM typically waits e.g. by entering an infinite loop. When using this option, the restoration code typically checks whether the restored program counter is inside the infinite loop and if it is so, the restoration-code sets the program counter to the instruction following the loop.

As described herein in Section 2, notification of the OS/VMM on the upcoming reset (shown in 1120) and probing for the acknowledgement message (while in state 910) preferably occur so that the state machine of the SEH never ceases to advance. The following property pertains to the notification procedure and to probing for acknowledgement function:
Property 3.1 Started in any of their internal states, the notification procedure and probing for acknowledgement function eventually terminate.

3.2 Global Predicate and the SES

When using the SES, the software designer may also add code to the restoration-code. The added code may check if the soon-to-be restored state is legal. The designer of the system may write a predicate p over the entire state of the system (the processor and the memory). The code added to the restoration-code checks if the predicate p holds for the state which is soon to be restored. In case the predicate p does not hold, the system may either be restarted (from the OS/VMM initial state) or its state can be corrected in any other way, say choosing the legal state that is closest in terms of Hamming distance.

Formally, the predicate p should identify a subset of the states $S_p$ that is closed under transitions and starting from which the legal behavior is guaranteed. When this embodiment is used, the designer need not guarantee any real-time requirements. However, the composition of such a predicate p may be more complicated than the composition of a predicate pertaining to Section 2.2. In particular, the predicate p typically checks that the state of the machine code program is legal by proving correspondence to the state of the program written by the designer (in, say, "C", ASM or pseudocode) [6].

3.3 Implementation Details for the SEH (Using Intel XScale)

The implementation of the SEH is an extension of the implementation of the PRM, described in Section 2.3. Two components are added. The first component is used for notifying the OS/VMM on the upcoming reset by triggering the save-code as described in detail herein. The second component is responsible for probing for a notification acknowledgement and is implemented using the same technique as the component used for probing for a reset-request.

Notifying the OS/VMM of the upcoming reset is performed by invoking an external debug break. The invocation of an external debug break causes the highest priority exception to occur. In the XScale debug mechanism, the code that handles the exception is known as the debug handler and is supposed to interact with the remote debugger. The debugging mechanism is typically overridden and the save-code installed at the debug vector.

Since the save-code is executed as an interrupt, the address of the instruction that was supposed to be executed next, before the interruption occurred, is held at the return address register (the lr register). Therefore, the value of the return address register needs to be saved as the program counter.

Since the implementation of the SES involves adding code to the OS/VMM, the restoration code typically avoids restoring a state in which the program counter points to the newly added code. The restoration-code typically achieves this by ensuring that the program counter is not in the predefined range of addresses used by the debug handler.

The first hardware component is used by the PRM for asynchronously notifying the OS/VMM about the upcoming reset. In this implementation the notification is implemented using an external debug break. The SEH component may invoke the debug break by scanning a value into the SELDCSR JTAG register in which the ext_dbg_break bit is set (Section 9.11.1.2 in [12] or 13.11.2.2 in [11]). This action initiates an external debug break which causes the processor to stop the current execution path (after clearing the pipeline), enter a Special Debug State (SDS) and branch to the debug handler (pointed by the reset vector). Notice that in order for the processor to respond to an external debug break by invoking the debug handler, the processor is typically set to halt mode (Section 9.3.1 in [12]) and the "Global Enable Bit" of the "Debug Control and Status Register" should be set (Section 9.4.1 in [12]). The user of the SEH typically makes sure that this configuration is applied in order to accept the warning that a reset is about to occur.

Property 3.1 holds for the implementation since the notification procedure includes a constant size sequence of JTAG messages, and the protocol is implemented using a straight line state machine.

Preferably, step 150 of FIG. 2 is based on the above-described embodiment of the invention.

Figure 13:
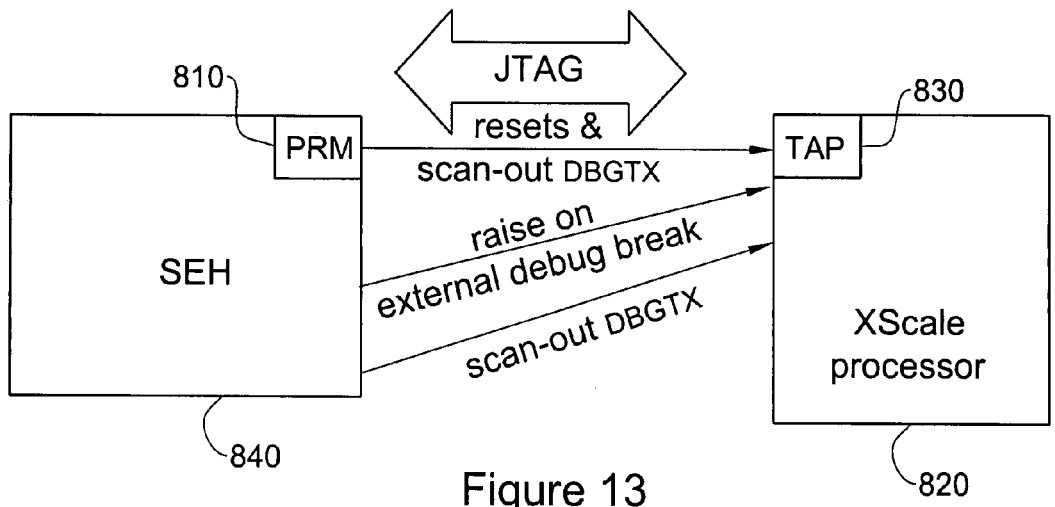
FIG. 13 is a simplified diagram of interactions between the SEH apparatus of FIG. 12 and an associated Xscale processor, provided in accordance with one embodiment of the present invention.

FIG. 13 illustrates the embodiment of the SEH. The SEH (840) embeds a PRM (810). The embedded PRM interacts with the processor (820) and the TAP (830) in a similar fashion to the one shown in FIG. 9. The two additional components of the SEH may interact through the TAP with the OS/VMM by issuing an external debug break and probing for the acknowledgement by scanning out the DBGTX register.

Figure 14:
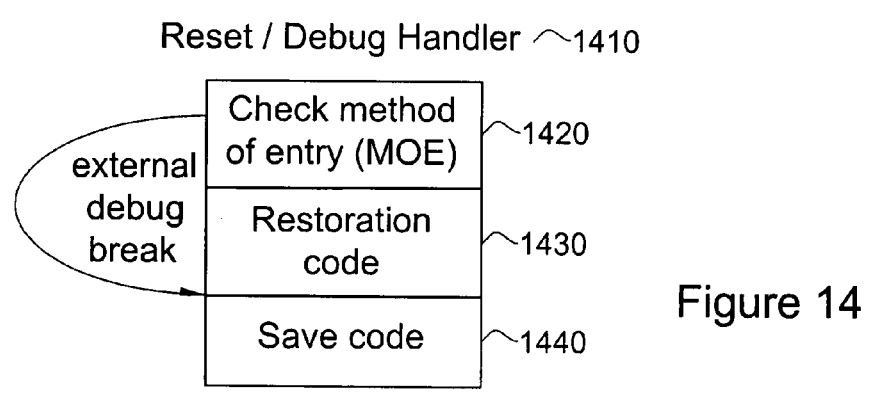
FIG. 14 is a code layout diagram of a reset-debug handler useful in implementing the embodiment of FIG. 13 and the method of FIG. 2 in accordance with an embodiment of the invention.

The Debug Handler (FIG. 14)

The XScale core allows the developer to install a debug handler. When the processor is set to a "Halt Mode" (Section 9.3.1 in [12]), the reset vector is overridden and used for holding the address of the debug handler. Since the processor may be configured to hold the reset vector at either of the following addresses: 0x00000000 or 0xFFFF0000 (depending on whether high vectors are configured, bit 13 of register 1 of CP15, see section 2.6.9 in [13]), the handler is typically installed at both addresses. FIG. 14 illustrates the debug handler code layout. Since the handler is used both for holding the save-code and the restoration-code, the handler (10) starts by reading the "Method of Entry" (MOE) bits of the DCSR register (20) (Section 9.4.6 in [12]) in order to discover the purpose of the activation. If the MOE bits indicate that the reason for the activation of the handler is a processor reset (value 000 see Table 9-1 in [12]), then the handler proceed to the restoration-code (30). Otherwise, the handler assumes that MOE is "External debug event asserted" (value 100), i.e., the SEH is notifying the upcoming reset. In that case, the save-code is executed (40).

The following section describes a method for using the functionality provided by the SEH in order to establish a system that enables to compose a self-stabilizing OS/VMM in spite the fact that a blackbox (non self-stabilizing) processor is used.

4 Stabilization Enabling System (SES)

A system that facilitates composition of a self-stabilizing OS/VMM in spite of the fact that an off-the-shelf non self-stabilizing processor is used, is now described. The system is based upon the stabilization enabling hardware (SEH)

described in Section 3. The SES enables the designer of a self-stabilizing OS/VMM to assume that the processor eventually executes the unchanged code according to specifications that are almost identical to the ones described in the processor manual.

The stabilization enabling system (SES) is responsible for ensuring that the processor does not permanently stay in an erroneous state. The SES aids in performing warm-boots and monitors the fact that the processor repeatedly executes these warm-boots. The term warm-boot refers to saving the processor state in the main memory, resetting (only) the processor (leaving the main memory unchanged), and then restoring the processor state to that which existed prior to the reset. The execution of a warm-boot ensures that the internal state of the processor is legal (non-erroneous); i.e., that it enforces the stabilization of the processor. Moreover, executing such a warm-boot during a fault free period does not effect the execution of the OS/VMM (other than stuttering).

Figure 3:
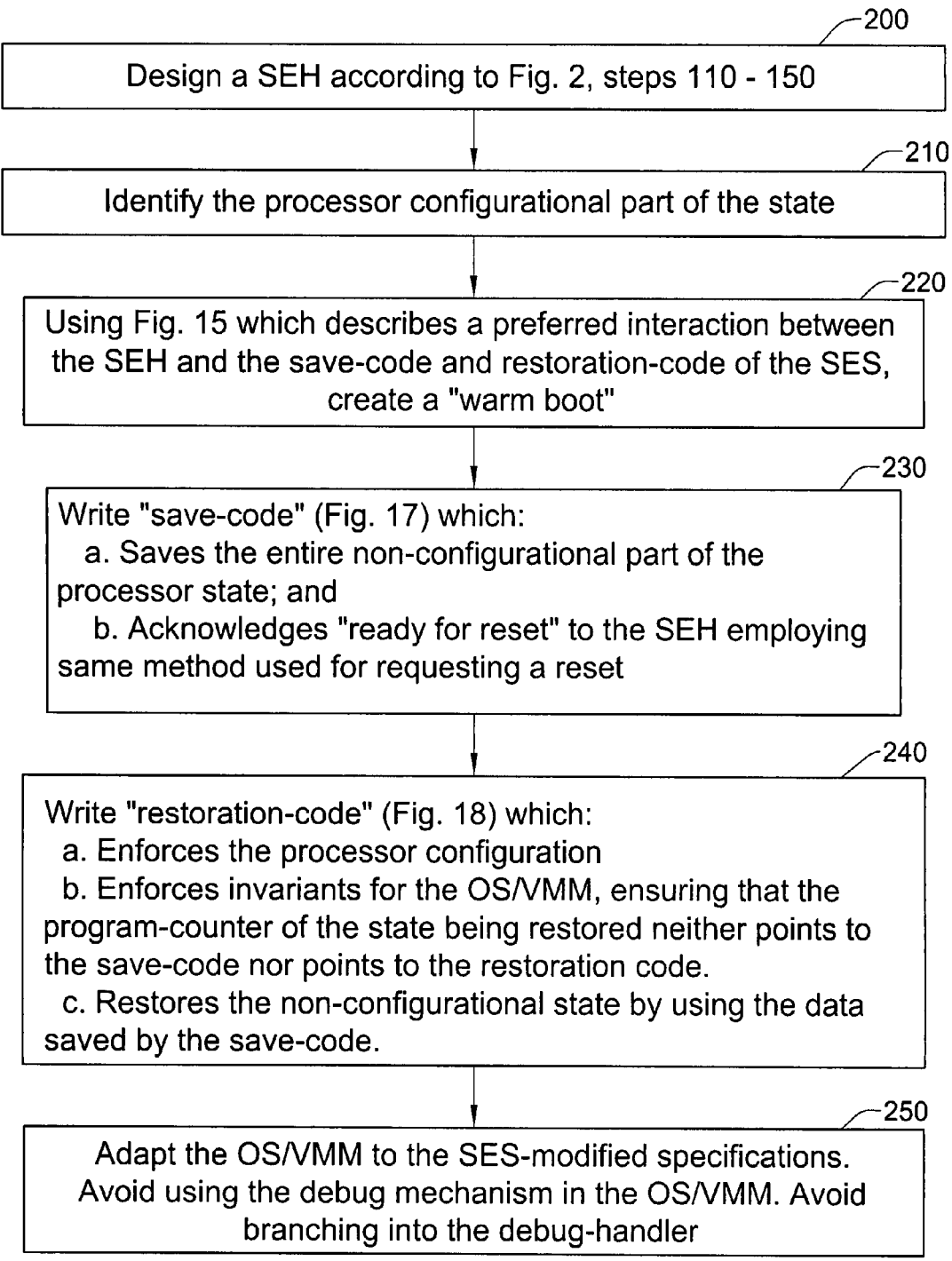
FIG. 3 is a simplified flowchart illustration of a preferred method for converting a processor into a self-stabilizing microprocessor, in accordance with a embodiment of the present invention and employing a stabilization enabling hardware-software system (SES) constructed and operative in accordance with a preferred embodiment of the present invention.

Instead of designing the processor to be self-stabilizing, a system may be created which, according to certain embodiments, periodically refreshes the state of the processor to exactly the same state if this state is legal, or to some other legal state, otherwise. Once the processor is in a legal state, and as long as there are no additional soft/transient errors, the state of the processor remains legal and the processor execution will be identical to the execution of the processor with no SES installed, up to clock speed and minor specification changes resulted in the SES-modified specifications described herein 4.1 Processor Operational Configuration The legal behavior of the processor was defined in [5] as fetching the instructions from the main memory, decoding them, and executing them as specified in the vendor manual. Here, this definition may be modified to support initial configuration for the processor. The state of the processor may be separated into two parts, as illustrated in FIG. 3, step 210. The first part of the state includes registers which are configured during the system boot and are not changed afterwards. These registers essentially determine the operational configuration of the processor, which is termed herein the configurational part of the state. For example, the ARM ([13]) architecture defines the control register (Section 2.4 in [13]) which is used, among others, to configure the MMU. The non-configurational part of the state includes the rest of the registers, as described in the specifications. For example, in the x86 architecture, the eax, eip, and esp registers are included in the non-configurational part of the state. Once such a separation is defined, the processor legal behavior is described for a specific configuration. Here, the state space includes any assignment to the registers of the non-configurational part of the state and machine instructions that may change the configuration (the content of registers included in the configurational part) are omitted from the specifications.

4.2 Warm-Boot Behavior

Performing a warm-boot in a legal processor state forces the configurational part of the state into its predetermined value and leaves the rest of the state unchanged. Performing a warm-boot in erroneous state results in any legal state in which the configurational part is set to its predetermined value. Moreover, the execution of a warm-boot in either a legal or an erroneous state ensures that the code executed by the processor is the code of the OS/VMM.

The implementation of the SES uses some features of the processor for interacting with the SEH. The original behavior of these features, as defined in the processor specifications, is therefore overridden by the SES. The specifications of the processor with the overridden features are termed herein the SES-modified specifications. An OS/VMM that avoids using these features is typically unaffected by the change in the specifications. In the XScale processor-based embodiment shown and described herein, the on-chip emulation functionality of the processor is overridden. The debug mechanism is used only in the development stages of the system and can therefore be safely overridden by the SES in deployed systems.

Performing warm-boots infinitely often ensures that eventually the processor behaves according to the SES-modified specifications with respect to the predetermined configuration and executes the original program. When using the SEH, the programmer is still responsible for the stabilization of the program when it is started at an arbitrary state. The following summarizes a property of a system that uses the SES.

Property T4.1 Started at any state, eventually the processor executes the original code and behaves according to the SES-modified specifications, up to stuttering, with respect to the predetermined configuration.

4.3 Implementing a Warm-Boot

Figure 15:
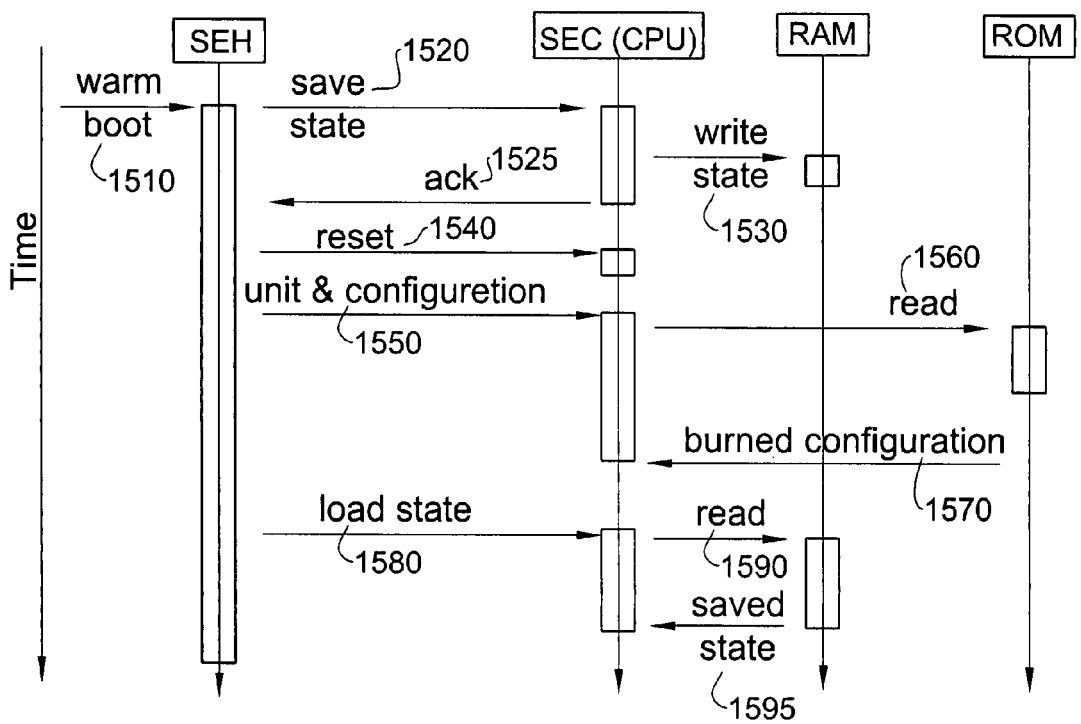
FIG. 15 is a sequence diagram describing a preferred interaction between the SEH of FIG. 9 and the SES employed in the method of FIG. 3.

FIG. 15 illustrates the sequence of messages exchanged between the SEH and the reset of the SES in the warm-boot scenario. The scenario starts with a notification 1540 of an upcoming reset, initiated by the SEH. The save-code, executed on the processor, saves the non-configurational part of the state. This includes the value of any registers used by either user or OS/VMM code, for example, the stack pointer. Since the state of the processor may be corrupted at this stage, no assumptions are typically made about the correct operation of the processor at this stage. In particular, the SEH does not assume that the save-code execution is finished in a finite period of time. Therefore, a simple timeout on the call is typically applied by the SEH, denoted by the clock icon near the "save state" call 1520. When the save-code execution terminates, it sends an acknowledgement message 1525 to the SEH, notifying that it is safe to perform a reset. Then, a reset 1540 of the processor is invoked. Notice that the main memory is left unchanged. From that point on, the processor operates according to the specifications. Next, the SEH invokes the restoration-code.

The first part of the restoration-code is responsible for restoring the processor's initial configuration (1550). At this stage, the configuration of the processor is loaded from a ROM device (1560). This configuration has been captured and burned during the design stage of the system. The second part of the restoration-code is responsible for loading the non-configurational part of the state, which has been saved by the save-code (1580).

4.4 Using the SES

The designer of the OS/VMM, when using the SES typically adapts the code to the SES-modified specifications. Performing code adaptation typically ensures that the OS/VMM code: (a) Avoids using mechanisms overridden in the implementation of the SES (In XScale, the debug mechanism), (b) Avoids branching to the newly added code.

4.5 Extensions to the SES

Three optional modifications of the stabilization enabling system are now described. The first and the second modifications are aimed towards better performance. The third modification facilitates composition of a self-stabilizing OS/VMM:

First Optional SES Modification: Timing Warm-Boots.

Suitably timing warm-boots may have a significant influence on performance. Executing warm-boots during the OS/VMM idle time can cause the warm-boots to go unnoticed by the user code. In order to support these features, a method may be provided which requests a reset from the SEH. In terms of the XScale implementation, this method comprises writing into the TX register.

Second Optional SES Modification: Supporting "Burning-Hot"-Boots.

In some situations, the OS/VMM may choose not to save and restore the entire state of the processor. For example, if the warm-boot is initiated by the OS/VMM during a context switch, the user mode registers are already saved by the OS/VMM, and therefore there is no need to save and restore them in the warm-boot process. After the OS/VMM scheduler chooses the next process to be executed, the scheduler can store this decision in memory and request a "burning-hot"-boot. The save-code and the restoration-code can use settings placed in RAM by the OS/VMM in order to decide which parts of the state should be saved and restored. The method used by the OS/VMM for requesting a warm-boot is modified, in this embodiment, to contain an infinite loop which is executed after requesting a reset from the SEH. This enables the OS/VMM to wait until the SES performs the warm-boot. The loop is broken using a special condition, which is placed in the restoration code, on the saved state (in XScale, the lr register, which contains the return address, is examined).

Third Optional SES Modification: Supporting OS/VMM Invariants.

The OS/VMM designer may add some functionality to the restoration-code in the form of invariant checks. For example, the OS/VMM designer may ensure that if in the restored state the processor is in supervisor mode, then the instruction pointer points to OS/VMM code (rather than to the user code).

4.6 Implementation Details for the SES (Using Intel XScale)

Figure 16:
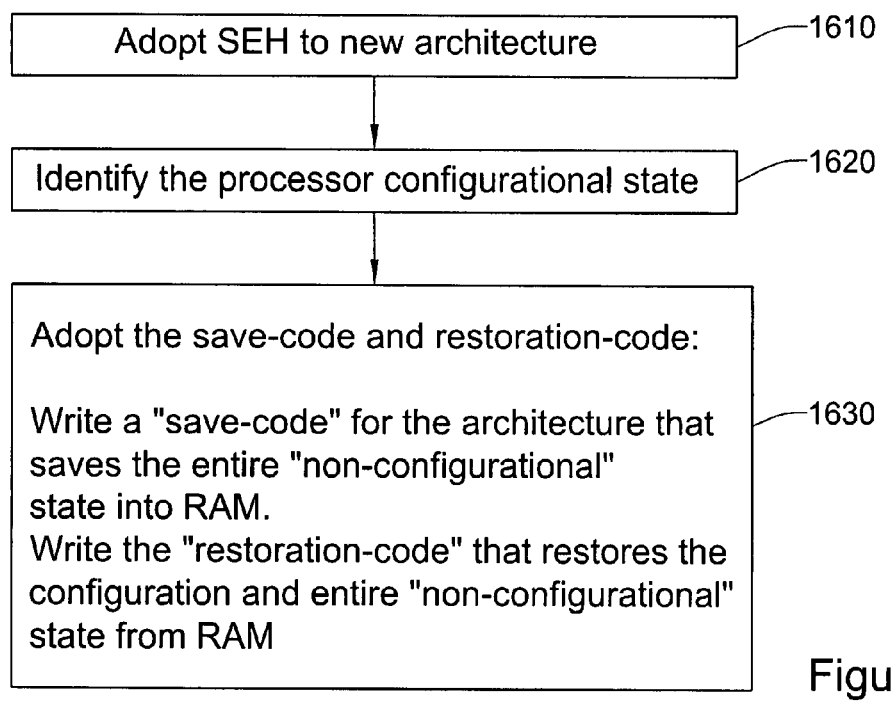
FIG. 16 is a simplified flowchart illustration of a preferred method for adapting the SES employed in the method of FIG. 3, to an individual architecture, in accordance with an embodiment of the present invention.
Figure 17:
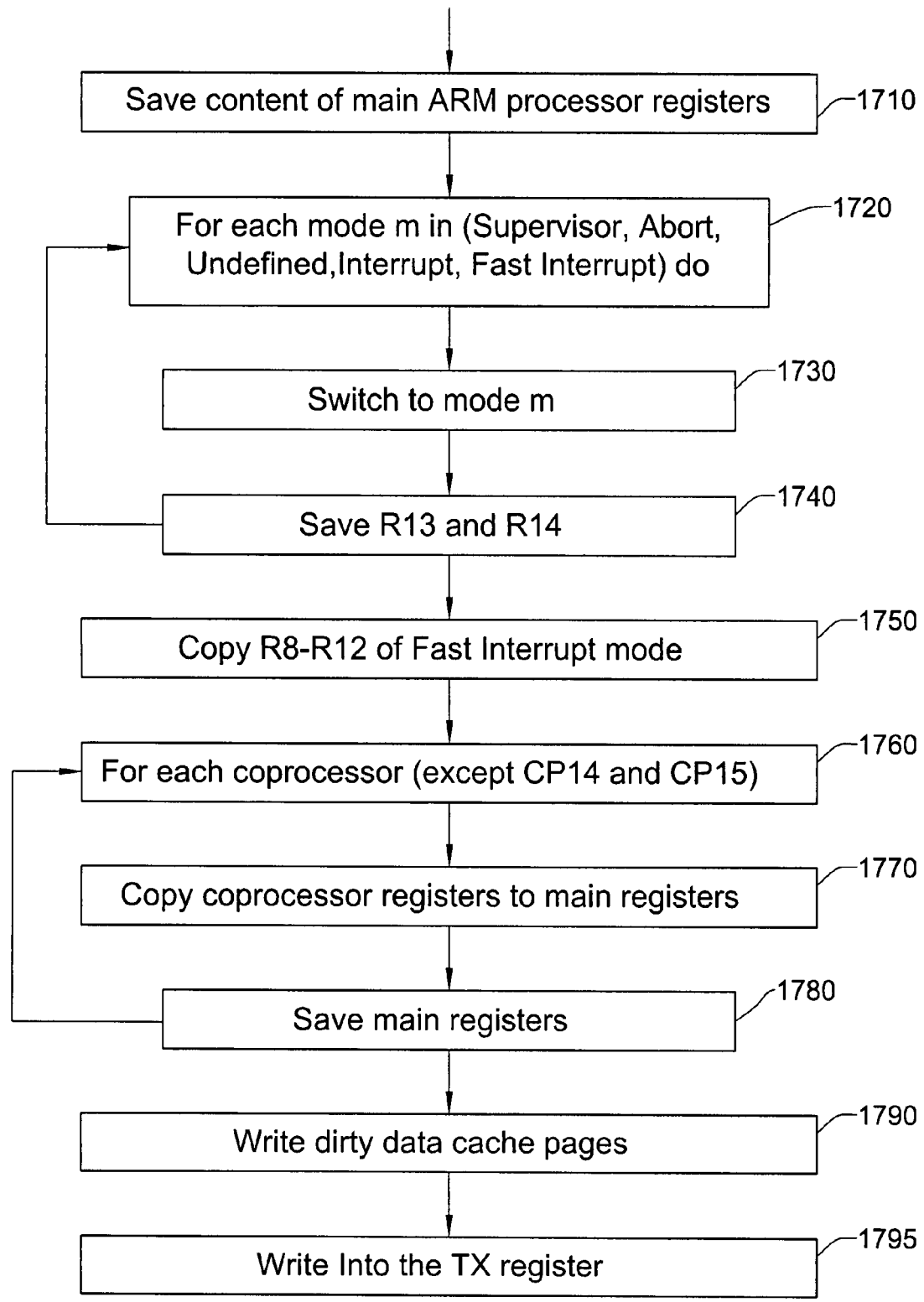
FIG. 17 is a simplified flowchart illustration of SES save code constructed and operative in accordance with a preferred embodiment of the present invention and useful inter alia in implementing step 60 of FIG. 1, step 160 of FIG. 2, and step 230 of FIG. 3.

FIG. 16 illustrates a preferred method for adapting the SES to a specific architecture. The first step 1610 is the adaptation of the SEH including finding an interface of the processor that allows saving the current state of the processor and a restart of the processor. If it is desired to initiate a reset request (by the OS/VMM), an interface may be provided for signaling such a request from the OS/VMM to the SEH.

The XScale processor is configured by setting the registers of two coprocessors (The System Control Coprocessor (CP15) and coprocessor 14). The separation of the processor state into its configurational and non-configurational parts therefore is straightforward. The configuration of the debug mechanism is also performed by writing in the abovementioned registers. The embodiment shown and described herein ensures that the defined configuration for the debug mechanism is appropriate.

In XScale, some of the registers have different copies for different processor modes (such as user-mode, supervisor-mode etc.). The save-code in the embodiment shown and described herein saves the main processor registers by traversing the different modes and saving the values held in the different copies of the registers. The registers of all coprocessors (except CP14 and CP15) are also saved in the memory and the dirty data-cache pages are written back into the memory. Then, an instruction that writes to the TX register is executed, signaling the SEH that the system is ready for a reset. An infinite loop is located at the end of the save-code.

The restoration code enforces immediate (constant) values on the registers of CP14 and CP15 which hold the configurational part of the state. Then, in a process reversed to that of the save code, the restoration code restores the non-configurational part of the state from the memory.

4.6.1 Processor Configuration

The System Control Coprocessor (CP15) and coprocessor 14 (CP14) are used for holding and managing the system configuration. The system control coprocessor holds 16 configurational registers and CP14 holds 4 additional registers. All these registers are accessible using the MCR/MRC instructions which are used for loading the coprocessor registers into and from the general purpose registers. Therefore capturing the configuration used by the OS/VMM during the adaptation of the SES to a specific OS/VMM can be effected by using an MCR command for each of the coprocessor registers and copying these registers to the main memory. Moreover, as specified in Section 3.3 herein, the "Global Enable Bit" of the "Debug Control and Status Register" is set and the Halt mode is chosen when enforcing a configuration.

4.6.2 The Save-Code

The code for saving the current processor state, which is generated in step 230 of FIG. 3, captures the state of all register banks of the main processor and the state of all coprocessors (except for CP14 and CP15, which contain system configuration). The above is carried out by using the MCR instruction, and then saving the general purpose register values in the main memory in a predetermined location. Registers which belong to different register banks (different processor modes) are accessed by switching to other processor modes (see Sections 13.5.1 and 13.15.2.2 in [11]). Moreover, the save-code writes the dirty data cache pages into the main memory (see Section 6.3.3.1 in [12]). When the save-code terminates, it acknowledges the SEH message by writing a value into the TX register (Section 9.9 in [12]). FIG. 12 illustrates preferred steps taken by the save code.

4.6.3 The Restoration-Code

Figure 18:
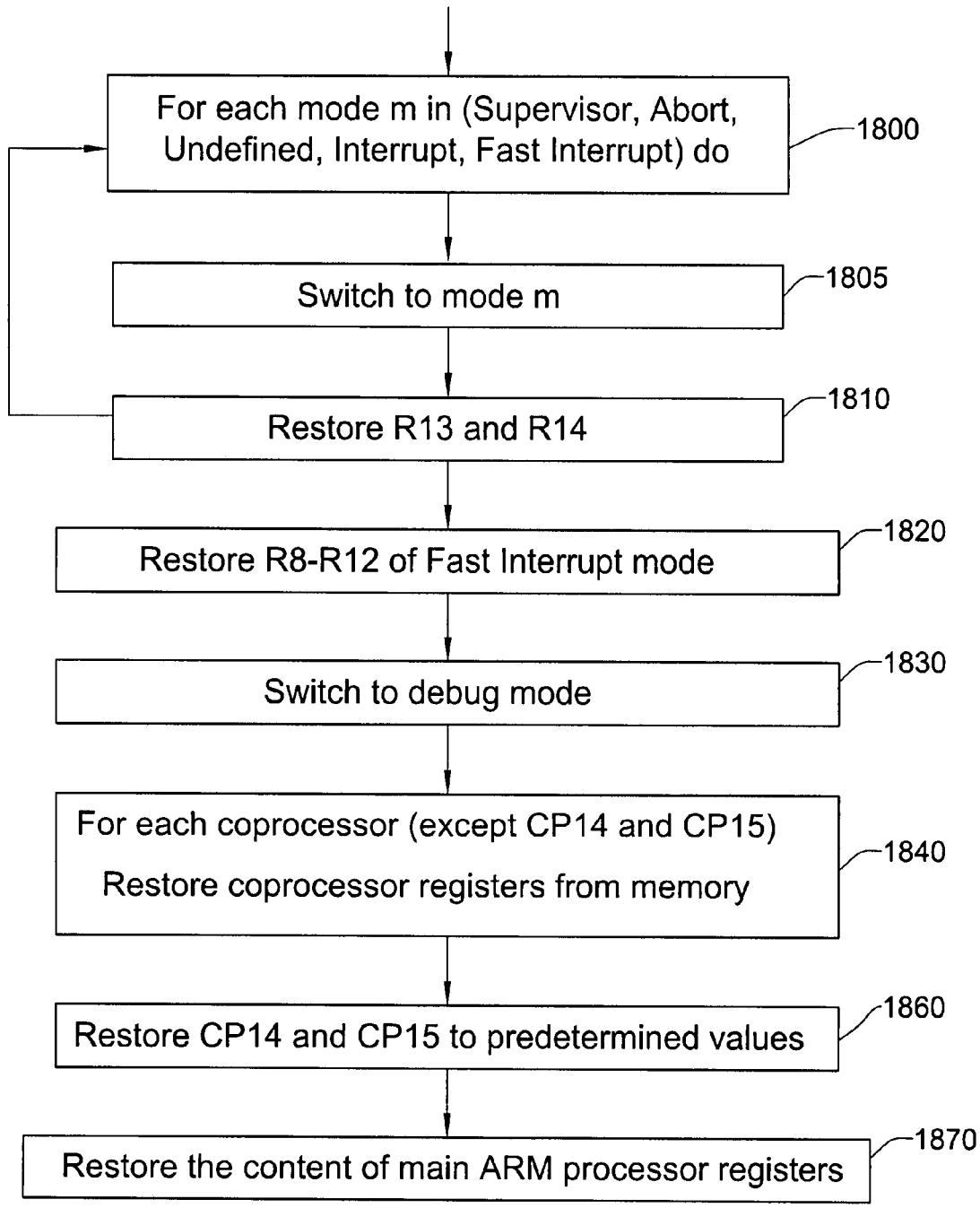
FIG. 18 is a simplified flowchart illustration of SES restoration code constructed and operative in accordance with a preferred embodiment of the present invention and useful inter alia in implementing steps 20 and 70 in FIG. 1, step 170 of FIG. 2, step 240 of FIG. 3 and step 330 of FIG. 4.

The code for restoring the processor state, which is generated in step 240 of FIG. 3, comprises a code that enforces the configuration and a code that restores the state to that existed prior to the reset. Initializing a specific configuration is performed by loading immediate values into the general purpose registers and afterwards by using the MRC instruction for each of the coprocessor registers. Loading the state which was saved in memory is implemented in a similar fashion, except for the restoration of the program counter. The restoration of the program counter may be carried out at the end of the handler by using a CPSR restore operation e.g. "subs pc, ltr, #4", as in section 13.5.1 in [11]. Prior to performing the final CPSR restore, the lr register, which holds the return address, is checked to verify that it does point to a location outside the SES code. This generally ensures that the OS/VMM regains control. FIG. 18 illustrates preferred steps included in the restoration-code.

4.6.4 The SES-Modified Specifications

In step 250 of FIG. 3, the OS/VMM is adapted to the SES-modified specifications. As cited above, the embodiment of the SES overrides the debugging functionality of the processor. Moreover, the handler code is placed in the main memory. The handler is designed in such a way that its execution terminates (by branching out the handler), even when started in a corrupted state. Therefore, eventually the OS/VMM regains control over the processor. However, it is up to the OS/VMM designer to ensure that the OS/VMM code either does not branch to the handler or faces the consequences of such an action.

5 Beyond the Processor: Adaptation of Existing System Code

Redesigning a commercial quality OS/VMM with the self-stabilization property may involve tremendous efforts typically including the development of a self-stabilization preserving compiler (see [6]) from general purpose languages (for example, "C" language) to machine language. Hereinbelow, methods are described for adapting existing system-code (OS/VMM) to be self-stabilizing.

The self-stabilization property of the processor is crucial for creating a self-stabilizing system. The systems described above in Sections 2, 3 and 4 are used for enforcing the stabilization of a processor without having detailed knowledge of its implementation. In fact, the systems described in previous sections hereinabove are used for facilitating development of self-stabilizing processors.

However, the environment which is used by current systems is much richer than the processor. In particular, operating systems and virtual machine monitors are used extensively. Developing a self-stabilizing OS/VMM with industrial quality from scratch requires enormous development efforts. These efforts may be significantly reduced by introducing a scheme and a design of additional hardware that ease the transformation of legacy code (e.g., a VMM) to be self-stabilizing, as described herein.

5.1 Enforcing Software Configuration

One assumption used when designing self-stabilizing functionalities is that the code executed by the processor is not corrupted. This assumption may, according to certain embodiments of the present invention, be extended also to the program data that change only during the boot and configuration process of the system. Since most of the variables of computer software remain constant following the boot and configuration stages, it is easier to define the portions of the memory in which there are content changes during the system run.

According to one embodiment of the present invention, hardware is added that supports capturing and "burning" the current state of the portions of the memory which contain configuration parameters. Memory read operations from addresses which were marked as containing configuration variables are later simulated in the additional hardware by reading from the burned ROM instead of from the main memory.

The presence of the mechanism described above allows easier modification of a legacy code to be self-stabilizing. The designer needs only to identify the portions of the memory the values of which may change after the boot and setup stages. After that, the stabilization of these portions to a consistent value is enforced.

Figure 19:
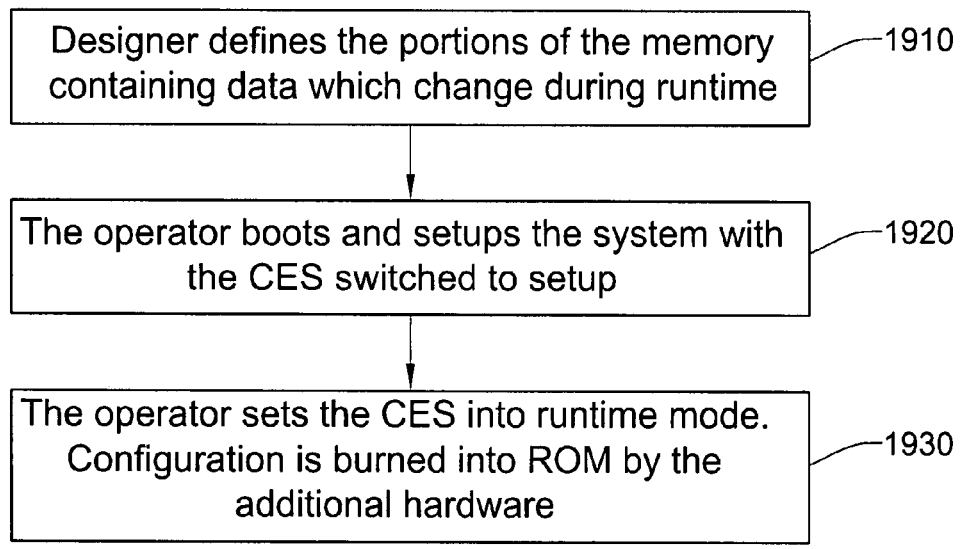
FIG. 19 is a simplified flowchart illustration of a preferred method for defining and burning a configuration, which is useful in conjunction with the processor conversion method of FIG. 3.

Optionally, the scheme shown and described herein may require the software to expose the addresses (physical page numbers) that contain the information that should remain constant during runtime (step 1910 in FIG. 19). A manual switch, the "configuration enforcement switch" (CES), may be added to the hardware. The switch is turned manually and may be in one of two states: "setup" and "runtime". Initially, the configuration enforcement switch is in the "setup" state. In this state the machine operates with no interference from the additional hardware (step 1920 in FIG. 19). When the operator decides that the setup stage is over, she flips the switch to the "runtime" state (step 1930 in FIG. 19). This flip triggers burning the content held in the memory addresses which were marked to contain configuration, into ROM. From that point on, any request to read software configuration from RAM memory is serviced (simulated) by reading from ROM. Notice that any of the embodiments described hereinabove in Sections 2, 3 and 4 ensures that the data cache is eventually consistent, and therefore the configuration used by the software is eventually correct.

Figure 20:
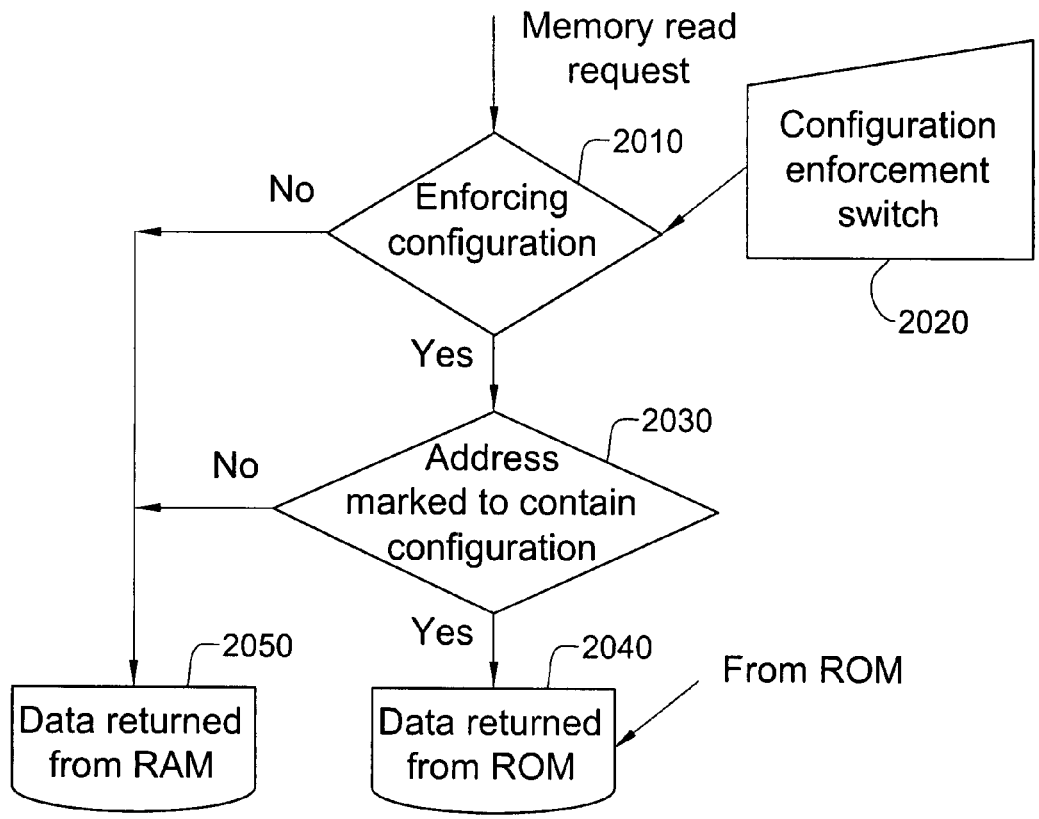
FIG. 20 is a simplified flowchart illustration of a preferred method for issuing a memory read request, in accordance with an embodiment of the present invention.

FIG. 20 illustrates the behavior of the additional hardware when a memory read request is issued by the processor. First, the hardware checks the state of the CES. If the switch is set to "setup" state (not enforcing configuration), then the data is retrieved from the RAM as in normal operation. Otherwise (if the switch is set to "runtime"), the address (physical page number) of the requested memory is observed. If this address is marked to contain configuration, then the data is retrieved from the burned ROM. Otherwise, the data is retrieved from the RAM.

Figure 21:
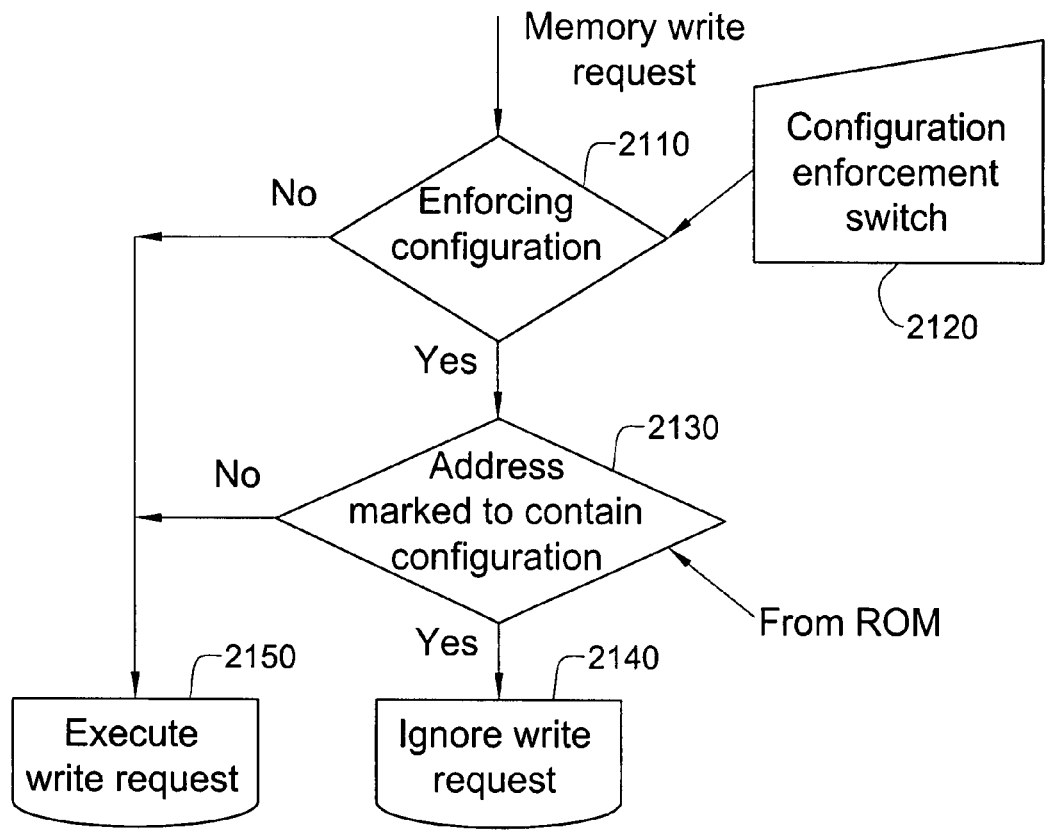
FIG. 21 is a simplified flowchart illustration of a preferred method for issuing a memory write request, in accordance with an embodiment of the present invention.

FIG. 21 illustrates the behavior of the additional hardware when a memory write request is issued by the processor. First, the hardware checks the state of the CES. If the switch is set to "setup" state (not enforcing configuration), then the memory write request is executed, as is usual, in RAM. Otherwise (the switch is set to "runtime"), the address (physical page number) of the requested memory is observed. If this address is marked to contain configuration, then the write request is ignored. Otherwise, the data is retrieved from the RAM.

5.2 Securing the Control Flow

Most machine languages include some sort of a computed-goto mechanism. The computed-goto mechanism includes a set of instructions that allows the program to branch to an address that is computed (rather than fixed in the code). In the context of self-stabilization, the existence of the computed-goto instruction is hazardous. One example of this is that a program may be started in a state in which the current instruction is a computed-goto instruction that branch to itself due to a corrupted state. Document [6] elects not to use the computed-goto mechanism in order to avoid this problem. However, the computed-goto instruction is widely used in computer software. This section describes a mechanism for ensuring that the target of each branch made by the system eventually passes a sanity check prior to the branch (in the machine code).

One usage of the computed-goto mechanism exists in the code that compilers (say, a compiler of "C") generate. The code generated by compilers for the purpose of returning from a function, branches to the return address which is stored in the stack (or in the lr registers, for the case of the XScale processor). The programmer of high level programs assumes that upon the termination of a method, the control of the program returns to one of the possible method callers. However, a corruption of the return address (whether it is held in the stack or in a register) may cause the branch to reach an erroneous position.

Another example of using the computed-goto mechanism, which is common in the "C" implementation of OS/VMM, is a computed-goto which is explicitly written by the programmer. In order to allow changing the implementation of an interface after compile time, the programmer uses pointers to functions. A "C" stract, holding the pointers to an implementation of a complete interface, may be employed for this purpose. The pointers to the functions are usually held in configurational variables, i.e., their value is set to a final value following the system boot and configuration. Notice that even if the values of the configurational variables holding the pointers to the functions are correct, corrupted branches are still possible, since the variable value is loaded into a register of the processor before executing the computed goto. The register initial value may be corrupted, causing, say, the computed goto to branch to itself.

The third example is related to the use of computed-goto for implementing polymorphism. When a call is made, for example in "C++", to a virtual function, the compiler generates code to read the function pointer from the virtual function table associated with the class of the current object. As in the previous example, the value stored in the register can be corrupted leading to the execution of an infinite (empty) loop. Moreover, in this instance the pointer to the object, that holds pointer to the virtual function table, is usually held in a non-configurational variable, and therefore it may be a subject of runtime corruptions.

According to an embodiment shown and described herein a sanity check of the address being used by the branching instructions is added. In some situations, such as the function calls in one of the examples above, the address is computed from constant variables and the computation code is the sanity check. The execution of each sanity check block starting from its first instruction will ensure the safety of the control. However, when starting in a corrupted configuration in which the program counter is in the middle of a sanity check block, there may be no guarantee that the program will ever exit the sanity check blocks.

Figure 22:
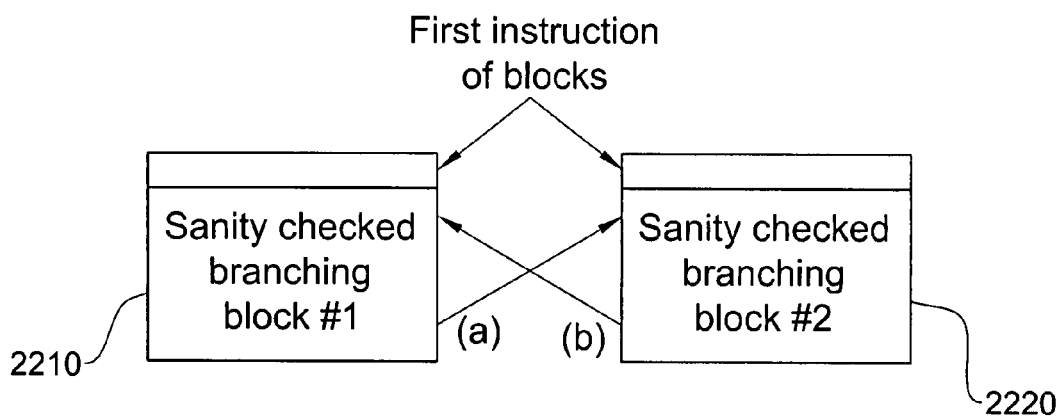
FIG. 22 is a pictorial diagram of an example of a hazard which can be overcome using the method of FIG. 4.

FIG. 22 illustrates an example of a hazard that exists when using the sanity checks. The sanity checked branching block 2210 is executed from the middle, due to a transient error. The partial execution of the sanity check and the corrupted state cause an erroneous branch (a) to the middle of the sanity check branching block 2220. The same process is repeated, this time a corrupted branch (b) to the middle of the sanity check block 2210 is performed. This process may then be repeated infinitely, while the execution remains within the sanity check blocks.

Typically, the programmer (or the compiler) marks the sanity check blocks, including the branching instruction. Then, the predicate check mechanism, described hereinabove in Section 4, may be used in order to check if the program counter of the system is currently pointing inside one of the sanity checks. If this is the case, an enforced "backjump" to the first instruction of the block is performed. The backjump ensures that the sanity check is executed starting from the first instruction. The following section describes assumptions which, if applicable to the sanity check, ensure that the backjump does not effect the legal execution following the stabilization. The behavior of the program is preserved by ensuring that the sanity check code is not allowed to interact with the environment and by ensuring that the execution of the sanity check can be stopped in the middle and started again from the first instruction of the sanity check.

5.2.1 Preferred Design Principles
Programs, Executions and Traces

In order to focus on the control of a program, the state variables of the system may be divided into two. The first part typically comprises only the program counter and the second part comprises the remaining state variables. A configuration of the system, $c=\langle pc,d \rangle$, is defined to be a pair holding two components. The first component, pc, maps the program counter to a specific value. The second component, d, maps the rest of the state variables of the system to specific values. A program, P, is a sequence of instructions $P_1, \ldots, P_n$ for some integer n. Each instruction $P_i$ is taken from a finite set of instructions, the instruction-set.

The instruction set may be divided into two groups: I/O-instructions and non-I/O-instructions. Non-I/O-instructions change only the internal state of the system, while I/O-instructions interact with the environment. When an I/O-instruction is executed, the next state may be a function of the input read by the system.

Let C be the configuration space of the system. Given a program P, denote $\Delta_P: C \to 2^C$ the transition function of the system that executes P. Given a configuration $c=\langle pc,d \rangle$, $\Delta_P(c)$ comprises of the set of configurations which may follow c in an execution. If $P_{pc}$ (the instruction being executed) is a non-I/O-instruction then $|\Delta_P(c)|=1$, otherwise, $|\Delta_P(c)| \geq 1$. An execution e of a program P is an infinite sequence of configurations such that $e=\{c_0, c_1, \ldots\}$ and for each $i \geq 1$ $c_i \in \Delta_P(c_{i-1})$.

The external behavior of a system is defined by traces. Every transition, in which an I/O-instruction is executed, is associated with a label. Generally, the label holds a description of either an output of the system (e.g., $\langle write, r_{22}, 42 \rangle$) or of an input of the system (e.g., $\langle read, r_{11}, 24 \rangle$). The trace of an execution is obtained by first reducing the execution to the transitions in which an I/O-instruction is executed and then by replacing each transition with the associated label.

Sanity Checked Programs

For the purpose of securing the control flow of the program, the branches made by the program are protected by sanity check code. Given a program P, a Sanity Checked Branching Block (SCBB) $scbb=\langle pc_{start}, pc_{end} \rangle$ is a consecutive sub-sequence of P that contains no I/O instructions. Generally, executing the instructions in scbb from any configuration, in which $pc=pc_{start}$, ensures that the program branches to secure locations. The (sanity checked) branching instructions (usually a computed-goto instruction) are also included in the block.

A Sanity Checked Program (SCP), $scp=\langle P, SCBBs \rangle$, is defined herein to be a pair which contains a program, P, and a set of sanity checked branching blocks, $SCBBs = \{\langle pc_{start}^i, pc_{end}^i \rangle\}$ A program counter position, PC, is within a SCBB, $scbb=\langle pc_{start}, pc_{end} \rangle$ if $pc \in (pc_{start}, pc_{end}]$. The notation $pc \in SCBBs$ is used if $pc \in scbb_i \in SCBBs$ for some i. The first instruction of each block is not included in the above definition since it is safe to branch to the first instruction of the block from outside the block.

A sane-execution $e=\{c_0, c_1, \ldots\}$ of $scp=\langle P, SCBBs \rangle$ is an execution of P such that for every configuration $c_j=\langle pc,d \rangle$, $pc \in sspc_i \in SCBBs$, if pc' is the program counter of $c_{j-1}$ then $pc' \in [pc_{start}^i, pc_{end}^i]$. In other words, in a sane-execution, whenever a sanity checked branching block is executed, the execution starts from the first instruction, assuring that an entire sanity check is performed for any address which is used by the computed go-to instruction located in the block.

Figure 4:
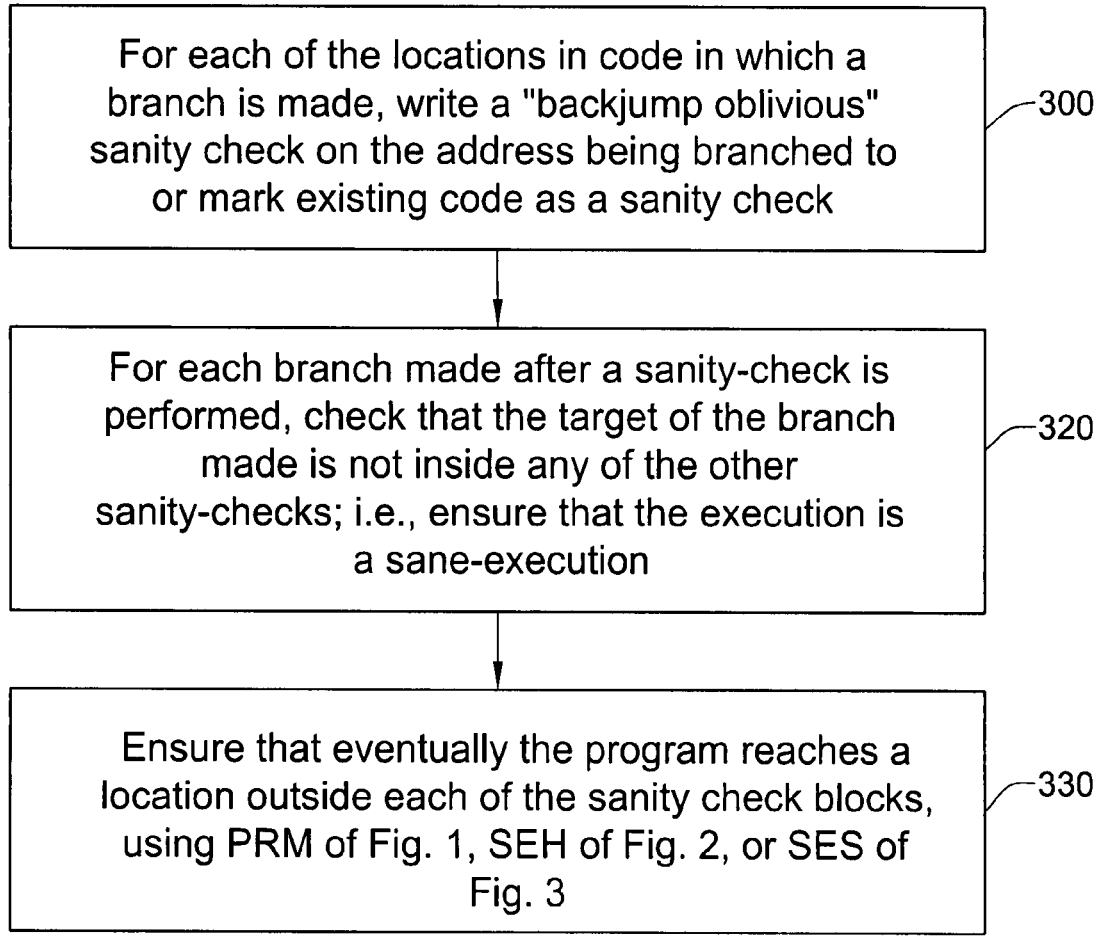
FIG. 4 is a simplified flowchart illustration of a preferred method for ensuring eventual invariance of execution of software by a processor in that the software will only branch to an address which satisfies a sanity check, which method is constructed and operative in accordance with another embodiment of the present invention.
Figure 5:
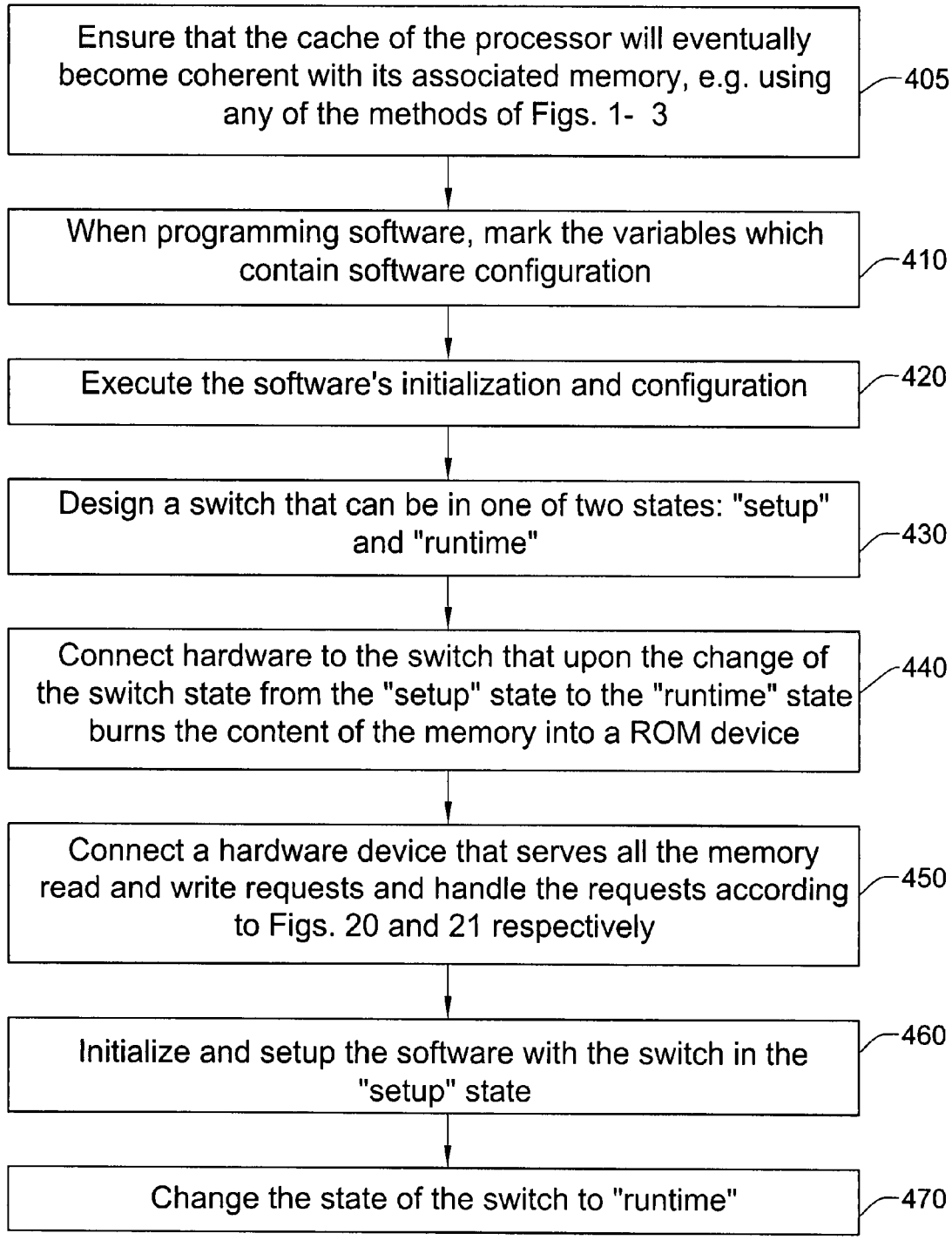
FIG. 5 is a simplified flowchart illustration of a preferred method for enforcing a fixed software configuration, typically despite occurrence of transient errors, constructed and operative in accordance with another embodiment of the present invention.

Preferably, the system and method shown and described herein ensure, e.g. as in FIG. 4, step 320, that, starting from any configuration, the execution eventually becomes a sane-execution. This task is typically impossible if during the execution the program may branch to the middle of a SCBB from a location which is not in SCBB. Thus, the following property is preferably imposed in the course of designing sanity checked programs:

A SCP, $scp=\langle P, SCBBs \rangle$, is said to be sound if every execution that starts in a configuration in which $pcSCBBs$ is a sane-execution of scp. Satisfying the property of being sound, is feasible. The execution of a sanity check prior to a branch gives the programmer an opportunity to ensure that the target of the branch is not in the middle of any of the sanity checked branching blocks. In some respects, the very fact that a SCP is sound, is equivalent to a self-stabilizing process having the closure property, as described in [3].)

The method shown and described herein, for ensuring that a sane-execution eventually occurs, changes the way the system executes programs. The changes in the system may potentially corrupt the semantics of the program. Using the notion of a trace it can be shown that upon stabilization, the change in the system is not noticed by the environment.

$LE_{scp}$, the set of the legal executions of scp, is defined to be the set that includes the traces of all sane-executions of scp.

Using Backjumps

Given a sound SCP, scp, the system and method shown and described herein is preferably operative to make sure that when started in any configuration, the trace of scp is eventually in $LE_{scp}$. To do so, the system may be changed so that the value of the program counter is examined at least once in every predetermined period of time. If the program counter points inside one of the SCBBs, the value of the program counter is enforced to point to the first instruction of that block. Next, the executions of the modified, backjumping system are defined.

A bj-execution of a SCP, scp=⟨P,SCBBs⟩, is a pair, $e_{bj}=\langle e,BJL \rangle$, such that $e=\{c_0, c_1, \ldots\}$ is an infinite sequence of configurations, $BJL=\{bj_1, bj_2, \ldots\}$ is a strictly increasing infinite sequence of positive integers (backjump locations) and the following conditions hold: (a) for each i∈BJL, if $c_i=\langle pc,d \rangle$ then pc∈scbb$_j$∈SCBBs and $c_{i+1}=\langle pc_{start}^j, d \rangle$. (b) for each i∉BJL, $c_{i+1} \in \Delta_P(c_i)$. A bj-execution is termed t-fair if at least t steps are made between two consecutive backjumps. Formally, $bj_{k+1} - bj_k \geq t$ for all $k \geq 1$. For any integer t, the restoration code of the SES can be modified so the system exhibits a t-fair bj-execution.

Notice that once a backjump is made, any computed-goto is protected with a sanity check ensuring that no branch is made to the middle of another sanity check. Therefore, once a single backjump is made, the condition (b) for sane-executions holds. However, in order to ensure that the trace of the execution is not affected by the change of the system, certain properties, described below, may be built into the program.

The first property is implicit in the definition of a SCBB which states that no I/O-instruction is included in a SCBB. However, this property alone is typically not enough. Any side effect caused by partially executing a SCBB is typically overridden by fully executing the same block again. The following property is sufficient for exhibiting such a behavior.

Given a program P, a SCBB, scpp=⟨pc$_{start}$,pc$_{end}$⟩, and two configurations c,c', c⇒scpp$_{c'}$ if there exists a sequence of configurations $\{c=c_0, c_1, \ldots, c_k=c'\}$ for which the following holds for all $1 \leq j \leq k$: (a) $c_j \in \Delta_P(c_{j-1})$, and (b) the program counter of $c_j$ is in the range (pc$_{start}$,pc$_{end}$].

A SCP, scp=⟨P,SCBBs⟩, is said to be backjump-oblivious with respect to a configuration c, if the following holds: (a) $c=\langle pc_{start}^i,d \rangle$ for some $1 \leq i \leq |SCBBs|$ (i.e., points to the beginning of the SCBB), and (b) for every configuration $c'=\langle pc',d' \rangle$ such that c⇒$^{scpp}$i$_{c'}$, it holds that $\langle pc_{start}^i,d' \rangle \Rightarrow^{scpp} i_{c'}$.

scp is backjump-oblivious with respect to c if one can in any configuration c' reached starting from c before leaving the block, safely enforce the program counter to the first instruction of the block and eventually reach the configuration c' again before exiting the block.

SCP, scp=⟨P,SCBBs⟩ is said to be backjump-oblivious with respect to t-fairness, where t is an integer, if the following two conditions hold: (a) For every configuration c such that $c=\langle pc_{start}^i,d \rangle$ for some $1 \leq i \leq |SCBBs|$ it holds that scp is backjump oblivious with respect to c, and (b) For each scbb∈SCBBs, any execution that starts from the first instruction of scbb leaves the block within t steps at most.

Condition (b) is designed to ensure that the program will continue to be executed during every t or less steps, even in the presence of backjumps (a t-fair bj-execution). In practice, the sanity check blocks are established first and an integer t large enough is chosen afterwards so that condition (b) holds. Then the frequency in which the program counter is examined and backjumps may occur is set so that the bj-execution is t'-fair for $t' \geq t$.

Formally stated, the simulation relation between the traces of sane-executions and bj-executions of backjump oblivious SCPs, is:

Given an integer t and a SCP scp=⟨P,SCBBs⟩ which is backjump-oblivious with respect to t-fairness. For every configuration c=⟨pc, d⟩ such that pc∈SCBBs, the trace of any t-fair bj-execution $e_{bj}$ of scp that starts from c belongs to LE$_{scp}$. This property is termed herein "Property L51".

This is typically the case because the t-fair bj-execution $e_{bj}$ of scp is used in order to construct a sane-execution e of scp with the same trace. The sane-execution is constructed by removing the parts of the bj-execution in which a backjump occurred. Each removed part starts from the first configuration after the actual backjump and ends when the bj-execution of the backjump oblivious SCP, scp, reaches the configuration prior to the backjump. Formally, denoting $e_{bj}=\langle\{c_0, c_1, \ldots\}, BJL\rangle$, the corresponding execution e is defined as $\{c_{k_1}, c_{k_2}, \ldots\}$ where $k_{i+1}=k_i+1$ if i∉BJL and $k_{i+1}=\min\{i+1:j>i$ and $c_j=c_i\}$ otherwise. The first condition (a) of backjump oblivious ensures that the min definition operates on a non-empty set. The second condition (b) of backjump oblivious, the condition of t-fairness, ensures that $k_{i+1}$ is smaller or equal to the index following $k_i$ in BJL. That is, the parts of the execution that have been removed do not overlap. Notice that in the first configuration of $e_{bj}$ the program counter is located outside any SCBB and therefore the constructed execution e, which starts in the same configuration, is a sane-execution. The sections removed from $e_{bj}$ have an empty trace since in every removed configuration the program counter is inside some SCBB. The t-fair bj-executions defined earlier do not ensure that a configuration in which the program counter is outside any sanity check block is eventually reached. In particular no upper bound is made for the number of steps made by an execution that starts from an arbitrary configuration before reaching a configuration in which the program counter is outside any sanity check block. The existence of such a bound is essential for guaranteeing a bound for the convergence time.

Given an integer α, a SCP, scp, and a t-fair bj-execution, $e_{bj}$, it may be said that $e_{bj}$ is α-converging if a steps at most are made in $e_{bj}$ before the bj-execution reaches a configuration in which the program counter points outside any of the sanity checked branching blocks. For every t and α such that t<α the SES may be used for creating a t-fair bj-execution which is α-converging.

The following property is useful in certain embodiments of the present invention:

Property T5.1 given two integers t, α and a SCP scp=⟨P,SCBBs⟩ which is backjump oblivious with respect to t-fairness, started in any configuration, and following α steps at most, the trace of any α-converging bj-execution of scp is in LE$_{scp}$.

This is typically the case, because, from the α-convergence of the bj-execution it follows that after α steps at most, the execution reaches a configuration in which the program counter is outside any SCBB. Once such a configuration is reached, the bj-execution exhibits a legal trace by Property L5.2.1.

Writing Backjump Oblivious Code

Referring e.g. to step 300 of FIG. 4, the sanity checked program can be rendered backjump-oblivious by ensuring that the result of any computation made by the sanity checked branching blocks is placed in temporary variables. For each of these variables, any read-operation from a variable is performed only after a write-operation to this variable has taken place. When a backjump occurs, the effect of the partial execution of the sanity check does not influence the second execution of the block which is the full one. When using a stack-machine, the temporary variables are typically allocated on a separate stack which is initiated to be empty before any variables of the sanity check block are allocated there.

A sanity checked program need not include only instructions with deterministic effect in the sanity checked branching blocks. Restricting the effect of the sanity checks only to temporary variables which are written to before they are read from, ensures that the trace of the execution is not affected by backjumps. Even though the configuration reached due to a backjump is different from the one that would have been reached if no backjump has occurred, the effect of partially executing the sanity check (before the backjump) is confined only to the temporary variables which are written to before read from.

5.2.2 Examples for Securing the Control Flow

Use of secure control flow to solve each of the three examples described at the beginning of Section 5.2, is now described. Step 300 of FIG. 4 may be based on some or all of these embodiments.

In the first example, computed-goto commands are used for returning from a function call. A sanity check may be used to ensure that the return address points to one of the callers to the function. The set of callers to the function is statically computed during compilation.

In the second example, function pointers are used for connecting an interface with its implementation. Code sections that already exist as sanity checked branching blocks may be marked. Each of the section starts by loading the configurational variable, which holds the function pointer, and ends with the actual computed-goto instruction.

The solution for the third example of using computed goto for implementing polymorphism extends the solution for the second example. Here, the sanity check first verifies that the pointer to the virtual function table is legal (i.e., points to the VFT of one of the class that are descendents of the current object's class). Then, the value held at the function table (which is a configurational variable), is loaded as part of the sanity check block.

Referring now to FIG. 4, step 330 can optionally be implemented using the SEH of FIG. 2 or the SES of FIG. 3. If this is the case, in the restoration-code, the program-counter of the state that is being restored is preferably checked to determine whether it points to the middle of any of the sanity checks. If so, the program counter is changed to point to the beginning of that sanity check.

5.3 Using Secure Control Flow for Securing Data and Critical Operations

Software systems are divided into components. The separation allows each of the components to be implemented with no knowledge of the implementation of the other components. The same separation is also preferred in the context of self-stabilization. The stabilization of one component may be a prerequisite to the initiation of the stabilization process of another component. Therefore, during the stabilization process of one component, the state of the other component is typically not corrupted. A designer of self-stabilizing computer methods usually defines private data for each component and assumes that this data cannot be accessed by other components. However, when implementing self-stabilizing computation methods or when converting software to be self-stabilizing, this assumption does not hold. For example, writing into an array in the "C" language with a wrong (corrupted) index may corrupt the state of another component. Therefore, when converting code to be self-stabilizing and when implementing self-stabilizing methods, typically, any write access to a variable eventually follows a sanity check of the address being referenced to.

Figure 23:
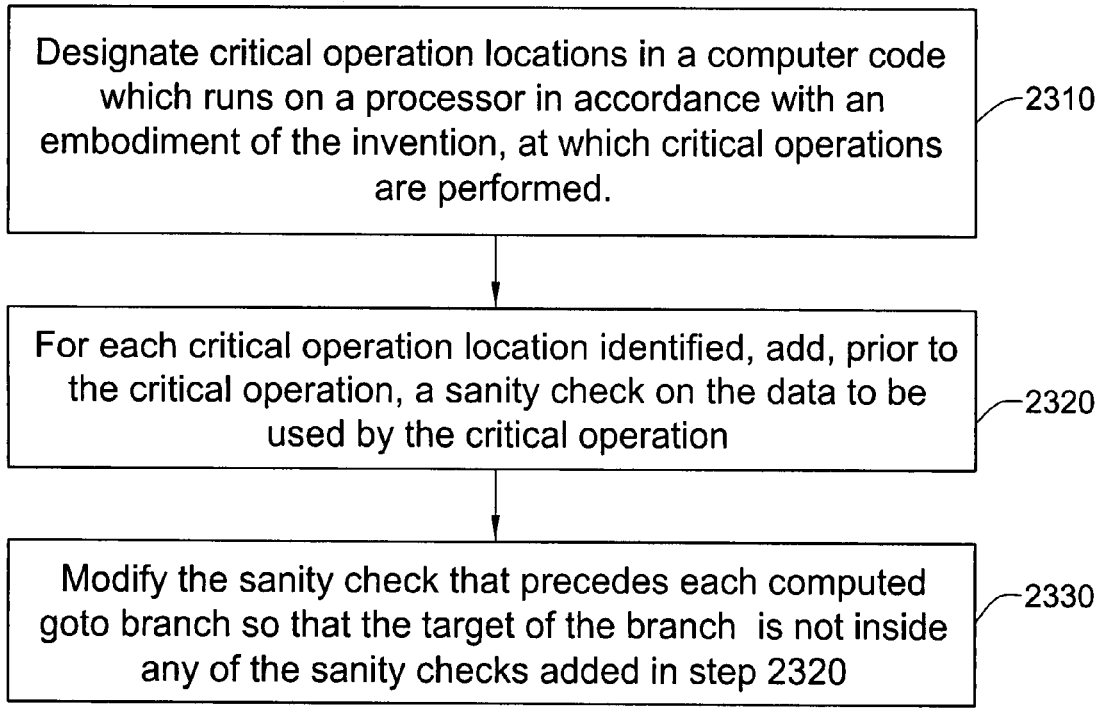
FIG. 23 is a simplified flowchart illustration of a preferred method for securing critical operations constructed and operative in accordance with an embodiment of the present invention.

Use of sanity checks for the address being written to may be extended beyond the scope of enforcing the component separation. As shown in FIG. 23, the programmer may add sanity checks for the data used by critical I/O-operations being performed, ensuring that eventually the execution of each of the critical operations follows a sanity check.

The programmer or compiler designer may define a set of Sanity Checked Critical Operation Blocks (SCCOB), each block comprising a sanity check followed by a critical operation. Then, the programmer ensures that in every sane-execution of the sanity checked program, all branches to the body of any of the SCCOBs have to be made from within the same block. This process typically comprises checking that each of the sanity checked branching blocks properly verifies that the address being branched to is correct and is not pointing to the body of any of the SCCOBs.

An advantage of the method of FIG. 23 is that starting from any configuration, one critical operation at most may be performed without its data going through a sanity check. The reason being the fact that there is no intersection between the SCCOBs and the SCBBs. The embodiment described in Section 5.2 above ensures that prior to exhibiting a sane-execution, the program executes code located only in the SCBBs and therefore does not perform any critical operation.

6 Self-Stabilizing OS/VMMs and Their Applications

Stabilization enabling hardware and schemes to enforce consistency are described hereinabove. It is now desired to make certain layers just above the hardware layer, self-stabilizing, in particular the (tiny) os layer or VMM layer.

Figure 24:
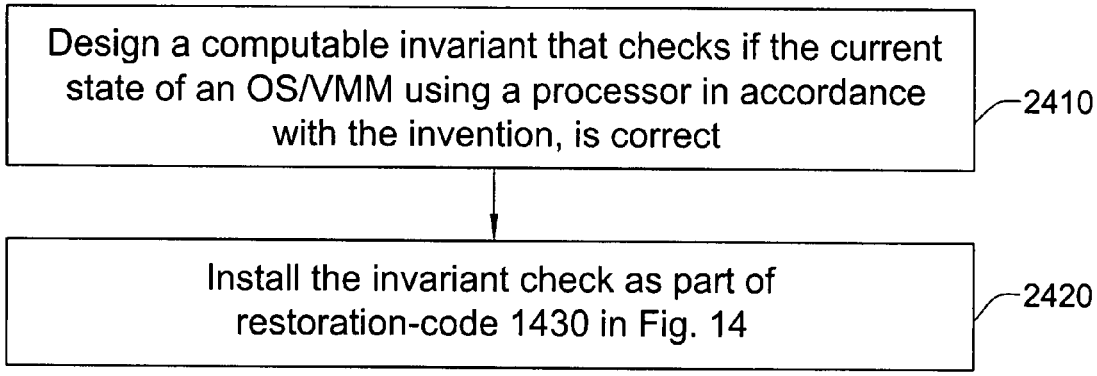
FIG. 24 is a simplified flowchart illustration of a preferred method for checking invariance in an OS/VMM constructed and operative in accordance with an embodiment of the present invention.

Virtual machine monitors enable the execution of more than one "virtual machines" on top of one machine. Current VMMs, such as XEN, guarantee the separation between the virtual machines. The original intention of this separation has been to protect against Byzantine operating systems. The corruption of one operating system is confined to the virtual machine it runs on. The separation property may be used in the scope of self-stabilization. The existence of a self-stabilizing VMM that exhibits the separation property enables parts of the system to be self-stabilizing regardless of the other Byzantine parts. In other words, the separation property prevents the corruption of the self-stabilizing os and software state during and after the stabilization period, by the non-self-stabilizing software executed by different virtual machines. A preferred method for achieving this is illustrated in FIG. 24.

6.1 Monitoring and Control Environment for Server Farms

Figure 25:
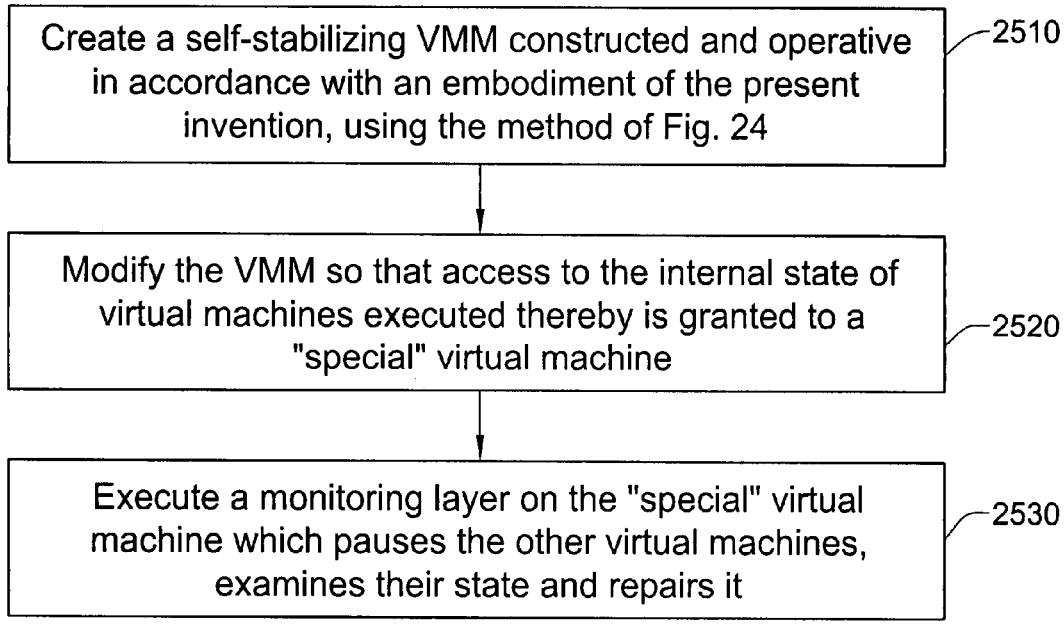
FIG. 25 is a simplified flowchart illustration of a preferred method for monitoring and controlling server farms, constructed and operative in accordance with an embodiment of the present invention.

Server farms use VMMs for consolidation. The farm includes numerous machines running VMMs and the tasks (virtual machines) of the farm are spread among the VMMs. The control of such a server farm may be effected using suitable monitoring and control software that communicates with the VMMs installed in the (physical) machines in the farm, e.g. as shown in the method of FIG. 25. The robustness of such a monitoring and control environment is important to the server farm. The existence of a self-stabilizing VMM enables the implementation of self-stabilizing monitoring and control environment for server farms.

A self-stabilizing monitoring layer has been suggested in [1]. The monitoring layer allows the definition (and monitoring) of predicates over the state of the software. The existence of a self-stabilizing VMM allows convenient monitoring of the software. Specifically, since the VMM can cooperate with the monitoring layer, it is possible to freeze and inspect the state of a monitored virtual machine (simply by not scheduling it). Moreover, the VMM enables the monitoring layer to manipulate the state of the monitored application (for example, reset the virtual machine).

6.2 Protected Management Layer for Networks

Protocols for managing networks such as SNMP and CMIP are becoming popular in recent years. The support for these protocols in network routers is desired to be robust. In some scenarios, management protocols are used for managing the traffic of the network and solving malicious and non-malicious conjunctions. Therefore, the operation of network management protocols is typically guaranteed even in the presence of conjunctions.

Figure 26:
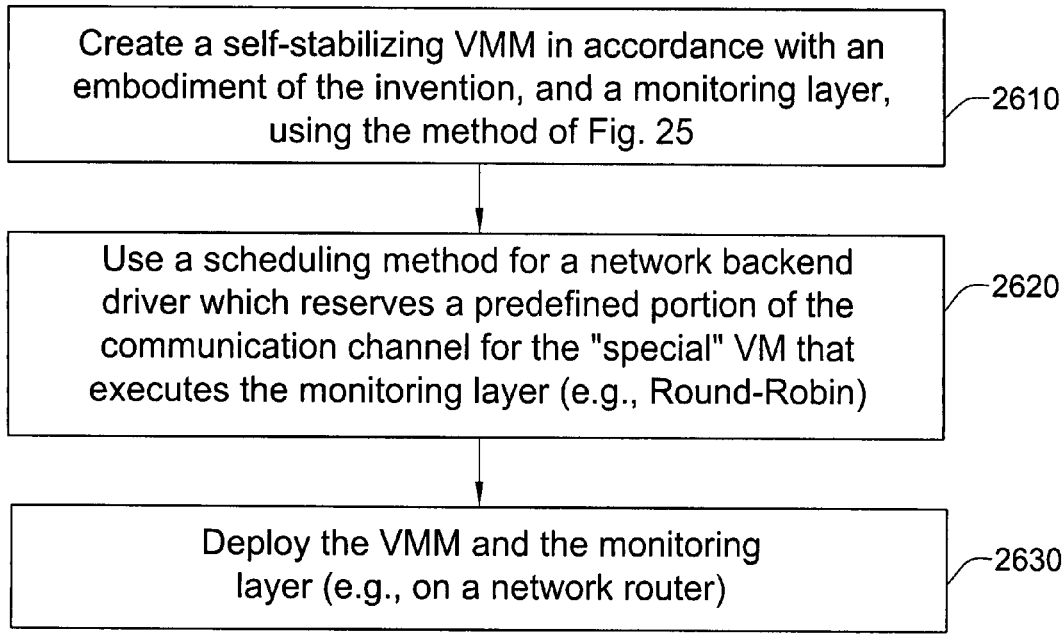
FIG. 26 is a simplified flowchart illustration of a preferred communication network management method constructed and operative in accordance with an embodiment of the present invention.

As shown in the method of FIG. 26, a self-stabilizing Virtual Machine Monitor (VMM) may be deployed in each router. The VMM is used for running two operating systems: the original OS and a self-stabilizing OS that runs the network protocols. If the management protocols applications and the usual router applications are executed by same operating system there is a risk of not performing critical operation of the control. The use of a VMM guarantees that the execution of the management protocols does not rely on the same operating system that runs usual router applications. Moreover, the management protocols are not influenced by any conjunctions in the network. The above mentioned guarantees are assured by the VMM, by virtualizing two important resources: the CPU and the network device. The CPU virtualization ensures that the methods which implement the management are executed. The network device virtualization guarantees that the management protocols are assigned with sufficient and predefined share of the bandwidth. Two or more independent and robust virtual networks, including the routers and the links, may thereby be achieved.

In summary, the existence of a self-stabilizing microprocessor is important for the implementation of self-stabilizing systems. The PRM, SEH and SES enable the enforcement of the stabilization property on commercial processors. These three alternatives give the designer of the OS/VMM three different starting points.

If the designer ensures that the OS/VMM requests at least one reset during every predetermined period of time, then, by using the PRM, no code need be added to the OS/VMM.

A designer who prefers not to request at least one reset during every predetermined period of time, while preserving some of the flexibility may still use the SEH, because the SEH typically allows the designer complete flexibility in choosing the save-code and restoration-code.

Using the SES requires effort from the OS/VMM designer in exchange for losing some flexibility. When using the SES, the OS/VMM is typically constructed and operative to avoid using the mechanisms which were used for implementing the SES. An implementation of the SES may choose redundant mechanisms (such as the debug mechanism in XScale), which are not used in deployed systems. However, the assistance provided by the SES to the OS/VMM designer is important, the designer may write invariants for the restored state and choose the preferred times for the OS/VMM to perform a warm-boot.

The aim of the embodiments described above in Sections 2, 3 and 4 has been to achieve stabilization (of the processor) by merely modifying an existing solution instead of designing a new one. It is believed that the same concept is suitable for creation of a self-stabilizing OS/VMM. For example, the embodiment described above in Section 5 may form technology suitable for applying the same concepts for OS/VMMs. Using the embodiment described in Section 5, the designer can concentrate on providing proven stabilization of the non-configurational part of the software state.

New methods for coping with the stabilization of complex software are described herein, including sanity enforced executions. Also described is the application of stabilization enabling technology to stand alone systems and communication networks.

According to one embodiment of the invention, the system may comprise one or more computers or other programmable devices, programmed in accordance with some or all of the apparatus, methods, features and functionalities shown and described herein. Alternatively or in addition, the apparatus of the present invention may comprise a memory which is readable by a machine and which contains, stores or otherwise embodies a program of instructions which, when executed by the machine, comprises an implementation of some or all of the apparatus, methods, features and functionalities shown and described herein. Alternatively or in addition, the apparatus of the present invention may comprise a computer program implementing some or all of the apparatus, methods, features and functionalities shown and described herein and being readable by a computer for performing some or all of the methods of, and/or implementing some or all of the systems of, embodiments of the invention as described herein.

It is appreciated that software components of the present invention may, if desired, by implemented in ROM (read only memory) form. The software components may, generally, be implemented in hardware, if desired, using conventional techniques.

The use of headings herein is for convenience of reference only and does not affect the interpretation of the specification and claims. Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A method for converting a processor, having a plurality of states and being operative to execute software operations stored in a memory device, into a self-stabilizing processor, the method comprising:
providing self-stabilizing watchdog hardware that, with given timing, interacts with the processor in accordance with an interaction sequence that includes at least one trigger that sets the processor to a known state from among a set of at least one known states;
providing a processor utilizing system which utilizes said processor, said processor utilizing system comprising a virtual machine monitor executing a plurality of virtual systems which all share said processor;
providing at least one design software segment operative to perform a check determining whether a current state of said processor utilizing system is consistent; and
ensuring periodic execution of said check by at least one design software segment,
wherein said processor is operative to serve an element of a communication network having a communication protocol and a bandwidth and wherein said plurality of virtual systems executed by said virtual machine monitor comprises
an operating system of said communication network element, and
a communication protocol manager which manages the communication protocol,
thereby generating a plurality of separate and separately stabilizing virtual communication layers each having a communication capacity, and each secured from influence of the others' activity.

2. The method according to claim 1, further comprising resetting the processor at intervals, using said self-stabilizing watchdog hardware.

3. The method according to claim 2, wherein said resetting occurs responsive to a software request.

4. The method according to claim 3, wherein said resetting is repeated if a predetermined time interval has elapsed without software requests.

5. The method according to claim 1, wherein the interaction sequence comprises provision of notification to the processor that said trigger is about to become operative.

6. The method according to claim 5, further comprising providing a set of at least one software segments operative to store information which is to survive reset for continued use after reset.

7. The method according to claim 1, further comprising providing a set of at least one software segments operative to store information which is to survive reset for continued use after reset.

8. The method according to claim 7, wherein, anytime during execution of an OS/VMM, the following sequence may occur: execution of save-code, reset of the processor and execution of restore-code.

9. The method according to claim 1, further comprising providing software segments for execution by said processor after said trigger, said software segments being operative to check whether the current state of the system comprising said processor and said memory device is consistent and if not, to convert said current state into a consistent state.

10. The method according to claim 1, wherein said processor utilizing system comprises an operating system.

11. The method according to claim 1, wherein at least one of the virtual systems executed by the virtualization system comprises a monitoring virtual system which monitors the remaining ones of the virtual systems executed by the virtualization system.

12. The method according to claim 11, wherein the monitoring virtual system has access to all variables accessed by the virtualization system.

13. The method according to claim 1, wherein said element of a communication network comprises a router.

14. The method according to claim 1, further comprising configuring said monitoring virtual system to allot at least a constant minimal share of said bandwidth to said communication protocol manager.

15. The method according to claim 1, wherein if a request is made, the self-stabilizing watchdog hardware continues into a state in which a reset of the processor takes place.

16. The method according to claim 1, wherein exactly one of the virtual systems executed by the virtualization system comprises a monitoring virtual system which monitors the remaining ones of the virtual systems executed by the virtualization system.

17. The method according to claim 16, wherein the monitoring virtual system has access to all variables accessed by the virtualization system.

18. A method for enforcing a fixed software configuration notwithstanding occurrence of transient errors, the method comprising:
in the course of generating software which assigns values to a plurality of variables, defining at least one variable as a configurational variable;
hard-wiring the values of said at least one configurational variable; and
redirecting at least one subsequent access attempt of at least one individual configurational variable, to the hard-wired value of said individual configurational variable.

19. The method according to claim 18, wherein said hard-wiring step is performed when the values of all configuration variables defined in said defining step, are final according to a finality determination criterion.

20. The method according to claim 19, wherein said finality determination criterion comprises an input by a human operator.

21. An apparatus for converting a processor, having a plurality of states and being operative to execute software operations stored in a memory device, into a self-stabilizing processor, the apparatus comprising:
self-stabilizing watchdog hardware that, with given timing, interacts with the processor in accordance with an interaction sequence that includes at least one trigger that sets the processor to a known state from among a set of at least one known states;
a processor utilizing system which utilizes said processor, said processor utilizing system comprising a virtual machine monitor executing a plurality of virtual systems which all share said processor;
at least one design software segment operative to perform a check determining whether a current state of said processor utilizing system is consistent; and
apparatus for ensuring periodic execution of said check by at least one design software segment,
wherein said processor is operative to serve an element of a communication network having a communication protocol and a bandwidth and wherein said plurality of virtual systems executed by said virtual machine monitor comprises
an operating system of said communication network element, and
a communication protocol manager which manages the communication protocol,
thereby generating a plurality of separate and separately stabilizing virtual communication layers each having a communication capacity, and each secured from influence of the others' activity.

* * * * *